United States Patent
Bertken

(10) Patent No.: US 12,276,717 B1
(45) Date of Patent: Apr. 15, 2025

(54) MICROWAVE MOTION DETECTION SYSTEM AND LIGHTING APPLICATIONS

(71) Applicant: Infinity X1 LLC, Carlsbad, CA (US)

(72) Inventor: Dennis K. Bertken, Carlsbad, CA (US)

(73) Assignee: Infinity X1 LLC, Carlsbad, CA (US)

(*) Notice: Subject to any disclaimer, the term of this patent is extended or adjusted under 35 U.S.C. 154(b) by 0 days.

(21) Appl. No.: 18/765,295

(22) Filed: Jul. 7, 2024

Related U.S. Application Data

(60) Provisional application No. 63/627,779, filed on Jan. 31, 2024.

(51) Int. Cl.

| | |
|---|---|
| *G01S 13/08* | (2006.01) |
| *F21S 9/03* | (2006.01) |
| *F21V 23/04* | (2006.01) |
| *G01J 1/42* | (2006.01) |
| *G01S 13/50* | (2006.01) |
| *G01S 13/88* | (2006.01) |

(52) U.S. Cl.
CPC ............... *G01S 13/08* (2013.01); *F21S 9/03* (2013.01); *F21V 23/0471* (2013.01); *G01J 1/4204* (2013.01); *G01S 13/50* (2013.01); *G01S 13/88* (2013.01)

(58) Field of Classification Search
CPC .......... G01S 13/08; G01S 13/50; G01S 13/88; F21S 9/03; F21V 23/0471; G01J 1/4204
See application file for complete search history.

(56) References Cited

U.S. PATENT DOCUMENTS

| | | | | |
|---|---|---|---|---|
| 4,148,028 A | * | 4/1979 | Fujiki | G01S 13/931 |
| | | | | 342/113 |
| 5,614,911 A | * | 3/1997 | Otto | G01F 23/284 |
| | | | | 342/124 |
| 2016/0154171 A1 | * | 6/2016 | Kato | G02B 6/0085 |
| | | | | 362/613 |
| 2021/0348734 A1 | * | 11/2021 | Bertken | F21V 23/0414 |

FOREIGN PATENT DOCUMENTS

| | | | | | |
|---|---|---|---|---|---|
| CN | 203894408 U | * | 10/2014 | | |
| CN | 108826165 A | * | 11/2018 | | F21S 9/00 |
| CN | 113432051 A | * | 9/2021 | | |
| CN | 116774173 A | * | 9/2023 | | |
| CN | 117890906 A | * | 4/2024 | | |
| EP | 4020012 A1 | * | 6/2022 | | B60G 17/019 |
| WO | WO-2015113003 A1 | * | 7/2015 | | A61N 5/01 |

OTHER PUBLICATIONS

Translation of CN203894408 (Year: 2014).*
Translation of CN116774173 (Year: 2023).*

* cited by examiner

*Primary Examiner* — Daniel Pihulic
(74) *Attorney, Agent, or Firm* — Wang Hardoon, P.C.

(57) ABSTRACT

A microwave motion detection system and lighting applications are disclosed. Time slicing and Pulse Width Modulation (PWM) techniques are used to improve efficiency in microwave motion detection sensors. Systems employing motion detection may control the detection of irrelevant motion with shielding and changing the power of the microwave motion detection sensor. Distance-based zones may be designated, and motion may be detected in particular zones. Different device operation may be performed based on motion detection in different zones. In lighting applications, varying device operation may include varying the direction, amount, or duration of light output. Device operation, when (Continued)

motion is detected, may also be based on the time of day, user preference, and power status parameters.

20 Claims, 13 Drawing Sheets

MICROWAVE MOTION DETECTION SYSTEM AND LIGHTING APPLICATIONS

PRIORITY

This application claims the benefit of priority to U.S. Provisional Patent Application Ser. No. 63/627,779 filed Jan. 31, 2024 and entitled "MICROWAVE MOTION DETECTION SYSTEM AND LIGHTING APPLICATIONS", the foregoing incorporated by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the field of microwave motion detection. More particularly, the present disclosure relates to microwave-based motion detection and lighting applications.

DESCRIPTION OF RELATED TECHNOLOGY

Motion detection-based lighting systems typically use motion sensors to detect the presence or movement of people or objects in a specific area. When motion is detected, the lighting system is activated, turning on the lights. Motion detection lighting is commonly used for outdoor security lighting, as well as for indoor applications in spaces like hallways, bathrooms, and closets. It enhances safety, reduces energy consumption, and adds a layer of convenience by automatically illuminating spaces when used.

Today, most motion detection lighting systems are controlled via Passive Infrared (PIR) based sensors. A Passive Infrared (PIR) motion sensor is a device that detects motion by measuring changes in infrared radiation caused by the movement of warm objects. PIR sensors are called "passive" because they do not emit any energy on its own; rather PIR sensors simply detect the infrared radiation emitted or reflected by other objects. While cost-effective, PIR sensor-based lighting systems have many drawbacks. PIR sensors have a low sensitivity, due in part to the passive nature of the technology and are prone to false alarms. Sensor coverage with PIR sensors provide a cone-shaped field of view, which provides a small coverage area. Because the narrow (directional) field of view of PIR sensors, such sensors do not necessarily sense the presence or motion of objects that are close to the sensor. Additionally, PIR sensors operate via line-of-sight and therefore are unable to detect motion behind objects (e.g., a car, a bush, and walls). Furthermore, lighting systems with PIR sensors are frequently bulky in size, require a large form factor, and have a visually unappealing dome that stores the sensor.

DETAILED DESCRIPTION

Figure 1A:
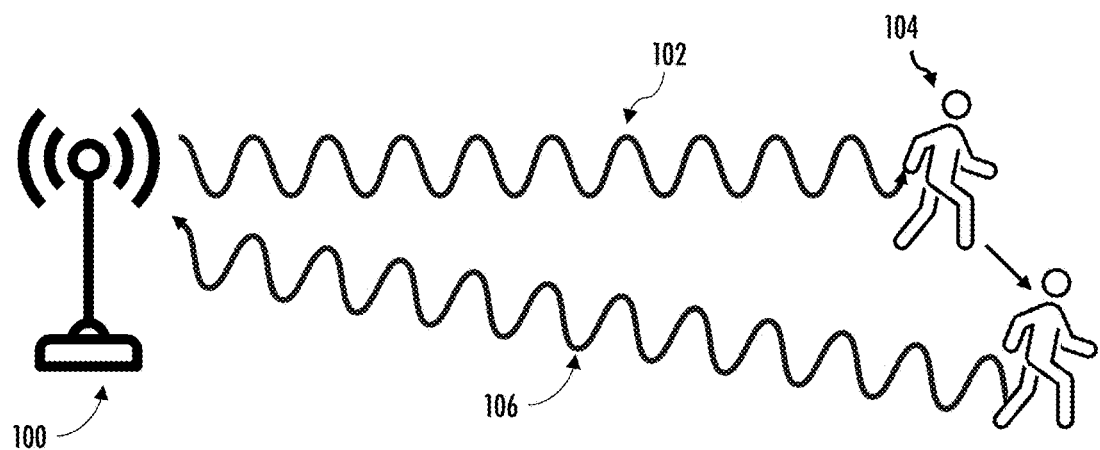
FIG. 1A illustrates operation of an exemplary microwave motion detector.

In the following detailed description, reference is made to the accompanying drawings. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

For purposes of the description hereinafter, it is to be understood that the specific articles, compositions, and/or processes described herein are exemplary and should not be considered as limiting. In the description, relative terms such as "lower," "upper," "horizontal," "vertical,", "above," "below," "up," "down," "top," "bottom," "underside," "front," "rear," and "side" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Aspects of the disclosure are disclosed in the accompanying description. Alternate embodiments of the present disclosure and their equivalents may be devised without departing from the spirit or scope of the present disclosure. It should be noted that any discussion regarding "one embodiment", "an embodiment", "an exemplary embodiment", and the like indicate that the embodiment described may include a particular feature, structure, or characteristic, and that such feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. The described operations may be performed in a different order than the described embodiments. Various additional operations may be performed and/or described operations may be omitted in additional embodiments.

1 Microwave Motion Detection

Microwave motion detection operates by emitting continuous microwave signals into the monitored area and analyzing the reflections caused by moving objects. The motion detection sensor contains a transmitter that emits microwave signals, typically in the gigahertz (e.g., 10.525 GHz) range, and a receiver that captures the reflected signals. When there is no motion, the emitted and received signals match, indicating a static environment. However, when an object enters the monitored zone and disrupts the microwave pattern, the sensor detects a Doppler shift in the reflected signals due to the object's movement. The Doppler shift is caused by the change in frequency as the object approaches or moves away from the sensor. The sensor's electronics analyze these frequency changes to determine the speed, direction, and presence of motion.

Microwaves are a form of electromagnetic radiation with wavelengths ranging from 1 millimeter to 1 meter. Microwaves possess the ability to penetrate certain materials based on their frequency characteristics. For example, microwaves can pass through common building materials such as drywall, wood, glass, and certain types of concrete. When microwaves encounter a wall, they may reflect off its surface, be absorbed by the material, or pass through it. The extent of penetration depends on factors such as the frequency of the microwaves, the thickness and density of the wall, and the specific composition of the materials involved. Metal, being a strong absorber and reflector of microwaves, can significantly impede penetration.

Motion detection using microwaves has the ability to penetrate obstacles and cover a broader area than other technologies such as PIR, making it suitable for applications such as security and automatic lighting applications. Microwave motion sensors may leverage this ability for detecting movement on the other side of the barrier, with changes in reflected signals indicating motion.

Motion detection may be undesirable in certain locations or through certain barriers. For example, some motion may not be relevant to detect (e.g., motion occurring far away, on a different floor, etc.) depending on the application. Detecting irrelevant motion can cause false positive/undesired activations and additional power consumption in those unneeded applications. Additionally, lighting devices employing motion sensors may be oriented in various ways to achieve desired lighting effects. Static schemes may limit the versatility of the placement and use of the lighting device.

Historically, microwave motion detection systems have generally had greater power requirements compared to other motion sensing technologies. The continuous operation of the microwave transmitter and receiver components, as well as the signal processing electronics, demands a relatively higher power consumption. The microwave sensor has needed to emit a constant stream of microwave signals and continually analyze the reflections to detect any changes indicative of motion. As a result, in applications where energy efficiency is a priority or in situations where power availability is limited, such as in battery-operated devices or off-grid installations, the use of microwave motion detection has been limited.

Accordingly, there is a need for more energy efficient microwave-based motion sensors as well as control mechanisms for controlling the motion detected by the motion detection sensor that allows for versatility of the placement and use of devices employing motion sensors.

Cordless lighting systems are lighting systems that are not hardwired to mains power. Such systems include lighting devices that are battery-operated (using e.g., rechargeable batteries) and/or are self-charging (e.g., using solar power). Cordless lighting systems may therefore contribute to energy efficiency and sustainability. Cordless lighting systems offers a range of benefits in various settings. For example, the ease of installation of cordless lighting devices, as cordless lights eliminate the need for complex wiring, making them an ideal solution for both temporary and permanent installations. This ease of installation enhances flexibility, allowing users to quickly and effortlessly rearrange lighting configurations. Cordless lights also provide increased portability, enabling users to place them in locations without proximity to electrical outlets. This portability proves particularly beneficial for outdoor events, camping, and emergency situations. Furthermore, the absence of cords enhances the aesthetic appeal of spaces by eliminating visual clutter.

According to aspects of the present disclosure, microwave motion detection sensors with improved power efficiency are described. In some aspects, time slicing and Pulse Width Modulation (PWM) techniques are used to improve the efficiency of microwave motion detection sensors.

According to aspects of the present disclosure, various techniques to control microwave-based motion detection sensors are described. For example, these techniques may be used to control the detection of irrelevant motion. In one such example, shielding may be used to limit the extent of the sensing capability. In other examples, by changing the power of the microwave sensor, different zones may be designated, and motion may be detected in particular zones (and ignored or not detected in other zones). Different device operation may be performed based on motion detection in different zones. For example, varying the direction, amount, or duration of light output. Device operation, when motion is detected, may also be based on the time of day (e.g., day/night) via an ambient light sensor, clock, etc.

According to aspects of the present disclosure, cordless lighting devices are described. Such lighting devices may include battery-powered (with, e.g., rechargeable batteries) and self-charging (e.g., solar powered) devices. These lighting devices may be configured for indoor and outdoor use. Lighting device designs are disclosed that may be installed in various orientations to control where light is directed. Such lighting devices may include control mechanisms to control motion detection and limit the detection of irrelevant motion. According to aspects of the present disclosure, power performance improvements of microwave-based motion detectors are described that make battery-operated implementations commercially feasible.

2 Improved Microwave Motion Sensor Efficiency

A microwave motion detector includes a transmitter that emits microwave signals and a receiver that captures the reflected signals. The transmitter includes an oscillator circuit that produces a stable and continuous oscillating waveform generating a signal at the desired microwave frequency. The transmitter transmits a continuous-wave (CW) signal, typically in the GHz frequency range. Nearby objects reflect part of that signal, which is received by the receiver. A mixer receives the signal sent by the transmitter and the reflected signal received by the receiver. The mixer outputs the difference between the transmitted and received signals, so static objects generate a zero-frequency signal while objects that are moving (and therefore reflecting a doppler-shifted signal) generate a signal whose frequency is proportional to the speed of the object.

FIG. 1A illustrates operation of a microwave motion detector 100. In some examples, the transmitter of the microwave motion detector 100 emits the microwave signal 102 continuously (without idling), and the receiver of the microwave motion detector 100 continuously (without idling) detects for a signal. The microwave motion detector 100 can calculate information about an object, including person 104, based on the doppler-shifted signal 106 reflected off the object. The information about the object may include the presence of motion, the velocity of the object, the size object size, etc.

Figure 1B:
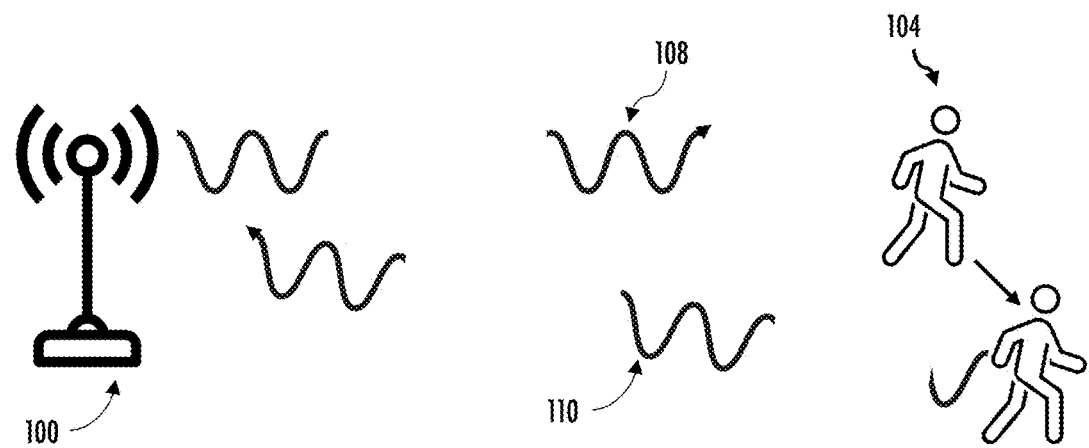
FIG. 1B illustrates operation of an exemplary microwave motion detector, according to aspects of the present disclosure.

FIG. 1B illustrates operation of the microwave motion detector 100, according to aspects of the present disclosure. In other examples, the microwave motion detector 100 may not continuously transmit/receive the microwave signal and instead time slice the signal. Time slicing may allow the microwave motion detector 100 to conserve energy without providing a noticeable disruption in operation. In such examples, the transmitter and/or receiver in the microwave motion detector 100 are active for a particular duration (transmitting and then idling or receiving and then idling) rather than operating continuously. The operation of the transmitter and/or receiver of the motion detector 100 may operate according to a given duty cycle. As used herein, "duty cycle" describes a fraction of time during which a component is periodically in an active state compared to a total period. For example, an 80% duty cycle (sometimes also referred to as an 80/20 duty cycle) refers to a component that is on/active for 80% of the cycle (and off/idle for 20% of the duty cycle). In some examples, the transmitter and/or receiver of the microwave motion detector 100 may operate at a duty cycle less than 100%. In some examples, the transmitter and/or receiver of the microwave motion detector 100 operates at a 10% duty cycle.

The transmitter of the microwave motion detector 100 emits the microwave signal 108 for a period of time and then idles before continuing to emit the microwave signal 108. In some examples, the receiver of the microwave motion detector 100 may also periodically idle (turn off or otherwise not attempt to detect a signal) based on the duty cycle of the transmitter. In other examples, the receiver operates continuously while the transmitter operates according to a duty cycle. The microwave motion detector 100 can calculate information about an object, including person 104, based on the doppler-shifted signal 110 reflected off the object.

In some examples, the microwave motion detector 100 has a fixed duty cycle. In other examples, the microwave motion detector 100 has a duty cycle that varies based on factors such as mode of operation, time of day/environmental conditions (weather, ambient light). For example, an energy efficient mode may conserve more battery power but use a lower duty cycle (e.g., 1%) compared to a normal mode with a higher duty cycle (10%), a performance mode (50%), or an always on mode (100%).

Figure 1C:
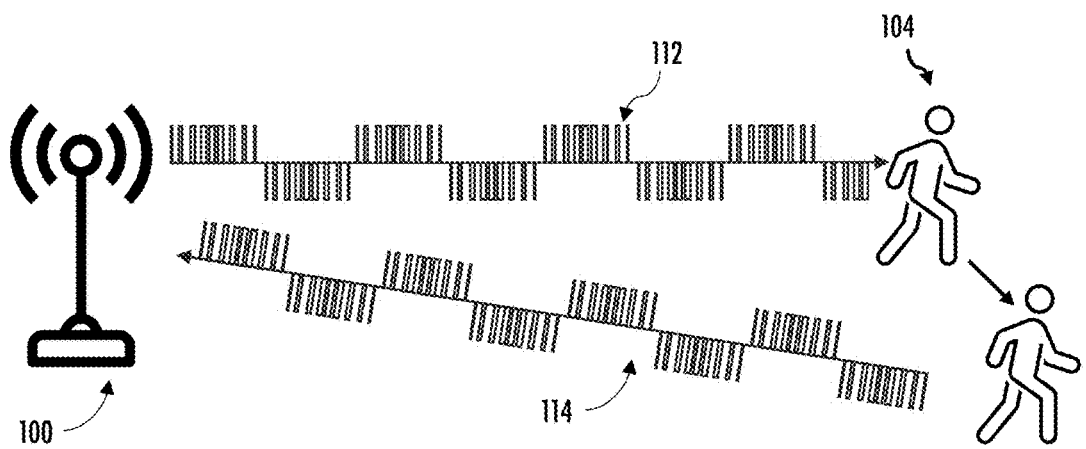
FIG. 1C illustrates operation of an exemplary microwave motion detector, according to aspects of the present disclosure.

FIG. 1C illustrates operation of the microwave motion detector 100, according to aspects of the present disclosure. Pulse Width Modulation (PWM) expands on the technique of using duty cycles to make transmissions of the microwave motion detector 100 more efficient. PWM is a technique that transmits a digital (and unipolar) square wave signal where the duration of the ON time can be adjusted (or modulated) as desired. For example, the microwave motion detector 100 may create a sinusoidal output by switching frequency much higher than the output frequency and varying the duty cycle according to a reference waveform (e.g., the waveform of microwave signal 102). The transmitter of the microwave motion detector 100 emits a square (or square-approximating) signal, microwave signal 112, idling between transmissions. The receiver of the microwave motion detector 100 may receive the doppler-shifted signal 114 reflected off the person 104 (or another object). The microwave motion detector 100 can calculate information about an object, including person 104, based on the doppler-shifted signal 114 reflected off the object (and differences from the transmitted signal, microwave signal 112).

Transmitter power of the microwave motion detector 100 may be tuned to the application needed. Specifically, to detect motion, the microwave motion detector 100 sends a signal (e.g., microwave signal 102, 108, and 112) and receives the reflected signal (e.g., doppler-shifted signal 106, 110, and 114) from objects. Attenuation of the signal transmitted and the reflected signal increases as the distance increases. As a result, in applications where motion detection is desired of objects farther from the microwave motion detector 100, greater power may be needed to send a signal that can reach that object. Similarly, where motion detection of farther objects is not needed, power usage may be lowered by reducing the power output of the transmitter/transmitted signal. For example, there are some applications where motion detection is only needed for objects within a short distance or range of distances (e.g., 8-10 feet, 15 feet, etc.) of the microwave motion detector 100 (e.g., under-counter lighting, task lighting in a space, indoor lighting). In these applications, the power to the transmitter may be relatively less (or reduced) compared to where motion detection is needed for detecting objects a greater distance (e.g., outdoor flood lighting). An added benefit is the potential reduction in false positive readings from irrelevant motion that would otherwise interact with the signal if sent with a higher power.

In some examples, transmitter power may be based on a selected device mode. A lighting device may have a number of modes each associated with a profile. The mode may be user selected, pre-selected (e.g., fixed) at manufacture, selected based on current conditions (e.g., time of day, weather), or determined by the microwave motion detector 100 based on use/a scan of the geometry of the space.

In one example, a virtual model of the space surrounding the microwave motion detector 100 may be determined by the microwave motion detector 100 during device setup (e.g., upon the microwave motion detector 100 being turned on for the first time, reset, moved/re-oriented). The model of the space may be used by the microwave motion detector 100 to select a mode, a profile, or transmitter characteristics. Transmitter characteristics may include adjusting the transmitter power. In microwave motion detectors 100 with multiple transmitters, beamforming/special filtering may be used to direct the transmission of the microwave signal in a particular direction based on the physical characteristics of the space or the use of the microwave motion detector 100.

Microwave radio signals are absorbed by water including precipitation (rain, snow, ice, etc.) leading to an attenuation of the signal in a phenomenon called "rain fade." This may impact the effectiveness of microwave motion detectors in certain (e.g., outdoor) applications such as in security lighting. The microwave motion detector 100 may compensate for the effects of rain fade. The microwave motion detector 100 may detect rain fade based on, e.g., certain changes in the received signal, detect weather conditions using an onboard sensor (e.g., a rain sensor), or receiving weather/precipitation information from an external source (via a network connection, connection to additional sensors). Transmission power may be temporarily increased to boost the transmitted signal to compensate for the effects of rain fade.

In some examples, the transmitter/receiver on the microwave motion detector 100 may idle/deactivate for a period of time after detecting motion. For example, a motion detecting light may activate and stay illuminated for 15 seconds following activation. In such cases, additional motion detected may not alter device functioning and the transmitter/receiver may idle for a period of time (e.g., 5, 10, or 15 seconds) while the device is active (e.g. the light is on) to conserve power, before returning to an active state.

In some examples, the transmitter/receiver on the microwave motion detector 100 may idle/deactivate based on an ambient light sensor in the device. For example, a lighting device may operate only from dusk to dawn and during other times (when, e.g., an ambient light sensor detects light), the microwave motion detector 100 may be idle to conserve power.

3 Microwave Motion Sensor Control-Detection Zones

Devices containing a microwave motion detector 100 may have specific behavior depending on the location or distance of detected motion. For example, the location or distance of motion may be determined to be irrelevant and ignored entirely. In other situations, the device may activate different modes of operation. In lighting applications, how long motion activated lights are on and/or how bright the lights get may be determined based on the distance of motion. In other applications, speaker systems, the volume of the sound output may be based on the detected distance. By varying device operation based on the detected distance, the device may operate in a more intelligent capacity and can save power by operating as needed.

The microwave motion detector 100 may detect the distance of a moving object based on power (amplitude) of the received signal (compared with the transmitted signal). In other examples, the microwave motion detector 100 uses the time of flight (ToF) of a transmitted signal to be reflected and received by the receiver to determine the distance of the moving object.

Figure 2:
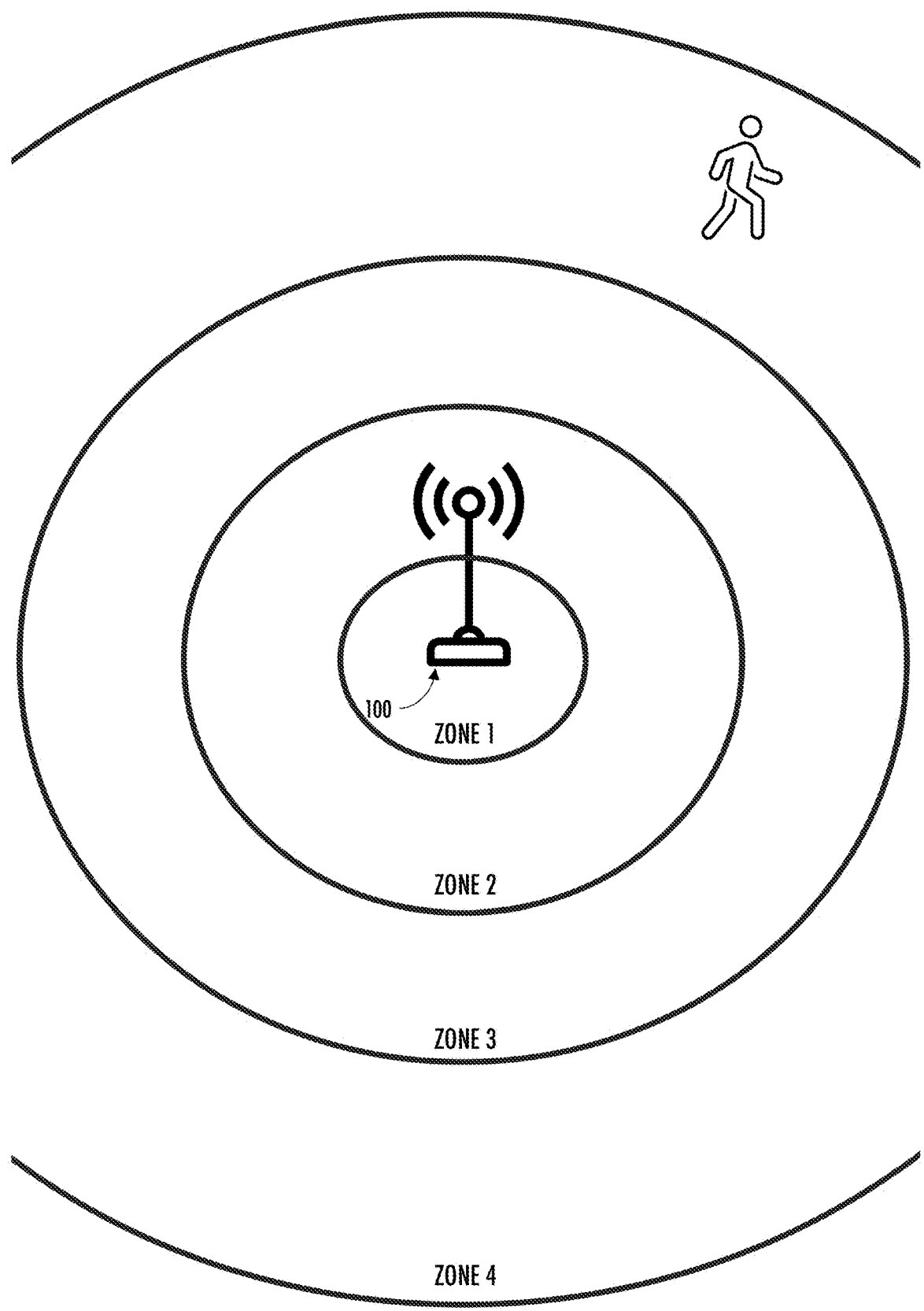
FIG. 2 illustrates a microwave motion detector having zone control, according to aspects of the present disclosure.

In some examples, distance-based zones are designated, and device operation may be based on movement detected (or ignored) in those zones. FIG. 2 illustrates microwave motion detector 100 having four zone control.

In one example, zone one may indicate motion of objects between 1 and 10 feet of the microwave motion detector 100; zone two may indicate motion of objects between 10 and 20 feet of the microwave motion detector 100; zone three may indicate motion of objects between 20 and 30 feet of the microwave motion detector 100 and zone four may indicate motion between 30 and 40 feet from the device. An outdoor security light may operate at 3000 lumens (L) for 60 seconds when movement is detected in zone 1, at 1000 L for 45 seconds when movement is detected in zone 2, at 500 L for 30 seconds when movement is detected in zone 3, and at 200 L for 15 seconds when movement is detected in zone 4. In alternative examples, device power/lighting strength may increase as motion is detected in a farther zone to illuminate the detected object.

For example, a motion-activated lantern may be placed on a table in the backyard. And when someone enters the backyard and approaches the lantern, the lantern turns on. When someone walks away from the lantern the lantern may dim after a period of time. In some examples, the lantern may include a solar cell to recharge a battery on the device. In such examples, the lantern may allow for automatic operation without the need to recharge the device.

Where motion is detected in multiple zones, device operation may be based on the closer (or further) zone. For example, where a person is detected moving 5 feet away from a lighting device in zone 1, and another person is detected moving 25 feet from the lighting device in zone 3, the lighting device may perform operation based on the motion detected in zone 1. In another example, the microwave motion detector 100 may activate the device when motion is detected at 40 feet/in zone 4 (e.g., a fence line), unless motion is detected in closer zones (e.g., when children are playing in the backyard) and such motion should be ignored.

The selection of certain lights or other devices (e.g., microphones or cameras) may be based on the zone detected. For example, spot lighting (having a narrow field of view) may be activated when motion is detected in a closer zone, and wider field-of-view lighting when motion is detected at a further zone. In another example, microphones/cameras may be activated when motion is detected at a closer zone whereas only lighting is activated when motion is detected at a farther zone.

As will be appreciated by those of ordinary skill given the contents of the present disclosure, different zone characteristics (number of zones, distance ranges, distances) may be used with equal success based on the application and device. For example, for indoor lighting, zones of shorter distances may be beneficial to discriminate between distances 1-3 feet from the microwave motion detector 100 and 3-10 feet from the microwave motion detector 100.

In some applications, motion detected in certain zones may be irrelevant. This irrelevant motion may be ignored by the device (e.g., the mode will not activate lighting, etc.). For example, motion detected close (e.g., within 15 feet) to the microwave motion detector 100 may be ignored for a light designed/position to illuminate an area 20 feet away. In other examples, motion detected far from the microwave motion detector 100 may be irrelevant. For example, a motion detection ceiling light may activate for motion detected 8-15 feet away as that motion is on the floor of the building. Motion detected a further distance away (e.g., 25-35 feet)

may be irrelevant as it is motion on a lower floor of the building. In some situations, motion detected in intermediate zones may be irrelevant for example, where security lighting is set to activate if there is motion detected on a lawn separated by a path-motion on the path may be ignored but motion detected on the lawn closer to and father from the microwave motion detector 100 may activate the device.

The microwave motion detector 100 may signal to other devices the detection of motion. For example, the microwave motion detector 100 on a security lighting device outside the home of a user may detect that someone is approaching the home or walking up the driveway or down the path. The microwave motion detector 100 may signal to other lighting devices (without motion detection) on the path or to an AC powered wall plug located inside (or outside) the house to activate based on the motion. The microwave motion detector 100 may include other sensors, e.g., an ambient light sensor, and can signal those other devices upon the detection of motion and when the ambient light sensor detects that it is dark (e.g., between nightfall and dawn).

A user may select the zones the device should operate in and the particular operating parameters when motion is detected in a selected zone. For example, motion at particular distances may be irrelevant (e.g., motion in a neighbor's yard) and a user may setup the device to ignore such motion. A user may also select the operation of the device when motion is detected in particular zones. For example, the lumen output and duration of a lighting device.

In some examples, zones based on distance may be further divided based on sector. Sectors may be angled slices of a distance-based zone. A zone may be separated into 2, 3, 4, 5, 6, or more different sectors. Different operational modes may be activated based on motion within different sectors of a zone. Operation may vary based on which sector of a zone motion is detected in. For example, some sectors may be ignored entirely (e.g., motion behind a wall) whereas other sectors may be ignored within certain zones.

4 Microwave Motion Sensor Control-Shielding and Signal Focusing

Microwave-based motion detection sensors may detect motion in any direction (e.g., 360°). In certain applications, motion in any direction may be relevant. For example, motion around a motion-activated lantern may correctly activate when motion is detected in any direction. In other applications, motion at certain angles may be irrelevant and controlling motion detection from certain directions may be useful in limiting false positive activations and unnecessary power usage. For example, a ceiling light may be installed on the ceiling of an apartment of an apartment building in order to illuminate a space when someone is home or active in the space. Unless motion detection is controlled, upstairs neighbors walking in their apartment would activate the ceiling light.

Figure 3:
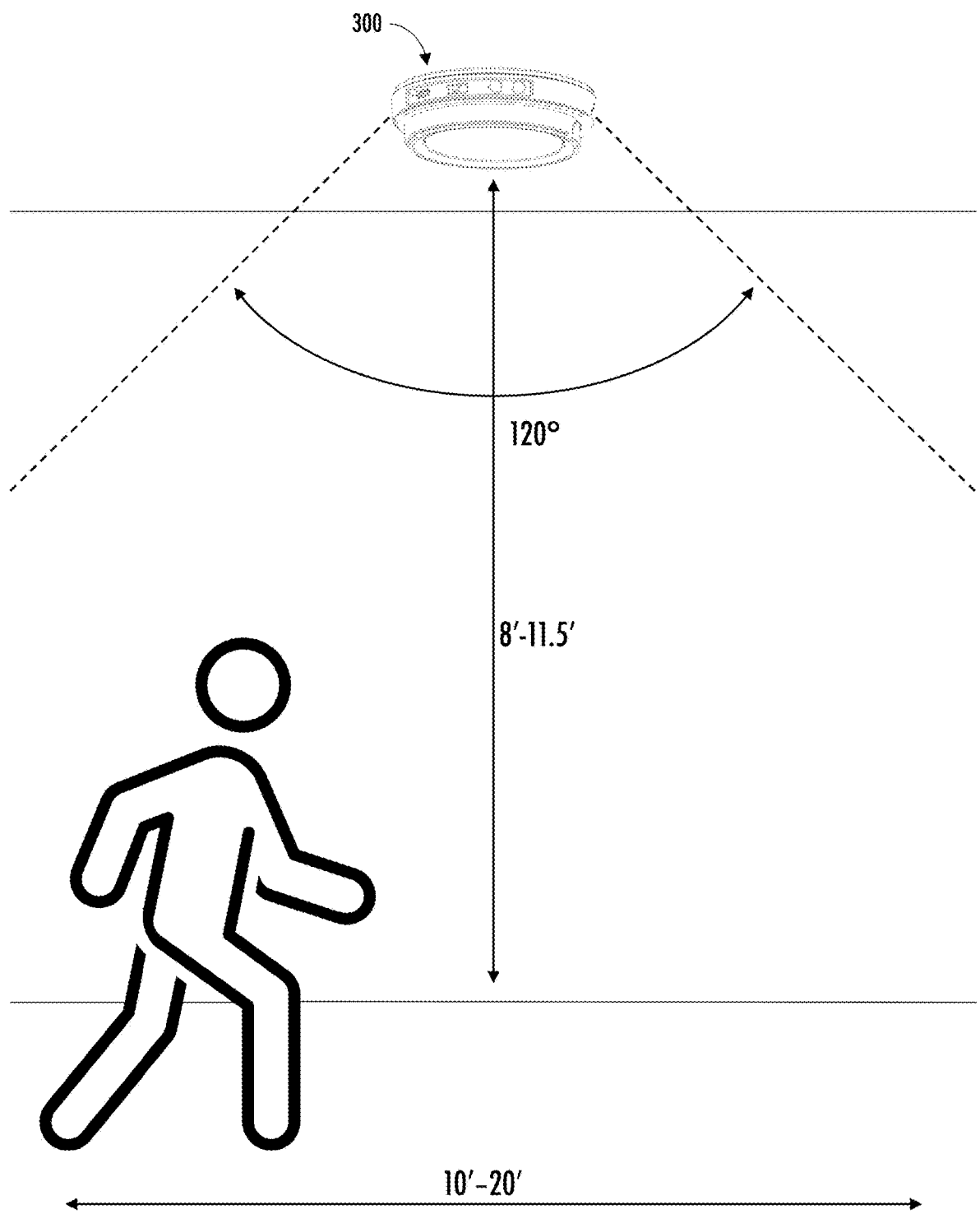
FIG. 3 illustrates an exemplary motion activated ceiling light, according to aspects of the present disclosure.

Metal shielding may be used to control motion detection at certain angles. In certain applications, reflective shielding may redirect/refocus transmitted signal from undesirable areas to areas where motion detection is desired. FIG. 3 illustrates an exemplary motion activated ceiling light 300, according to aspects of the present disclosure. Metal plated labels may be placed on the side of the ceiling light 300 connected to the ceiling. The shielding may limit transmission of the microwave signals behind the shielding and therefore detection of motion in those undesirable/irrelevant areas. Shielding may extend down the sides of the ceiling light 300 to further limit the angle of motion detection/activation. As shown, the ceiling light 300 may limit the angle of activation of the ceiling light 300 to a certain angle (e.g., 120°). This shielding may limit false-positive activations by an upstairs neighbor.

Ceiling lighting products may have a pre-set installation height range. For example, ceiling light 300 may be designed for installation at typical ceiling heights (e.g. 8-11.5 feet). Combined with transmission power limitations (to control motion detection beyond a certain distance), a microwave motion detector in the ceiling light 300 may not perceive motion in areas below the floor (e.g., a lower floor of the building). The ceiling light 300 may have a 10-20 foot motion detection range of the floor underneath the ceiling light 300. Additional shielding, e.g., an extendable shroud may be used to further limit the propagation of transmitted microwave signals to irrelevant areas such as out the rear or sides of the ceiling light 300.

The foregoing description of the use of shielding is presented with respect to a motion activated ceiling light 300. As will be appreciated by those of ordinary skill given the contents of the present disclosure, the use of shielding may be used differently and the angle or areas shielded from microwave transmission may be different (e.g., greater or lesser) for different end user applications than illustrated in FIG. 3. For example, a larger angle for motion detection (e.g., 160°) may be desirable/relevant where the intended installation height of the ceiling light is greater and therefore shielding may not be used as far down the sides of the ceiling light to allow the microwave signal to pass through to other areas. Motion detection through ceilings/floors may also be relevant to activate lighting (or other functionality) near a staircase or elevator.

5 Exemplary Motion Activated Lighting Device

Figure 4:
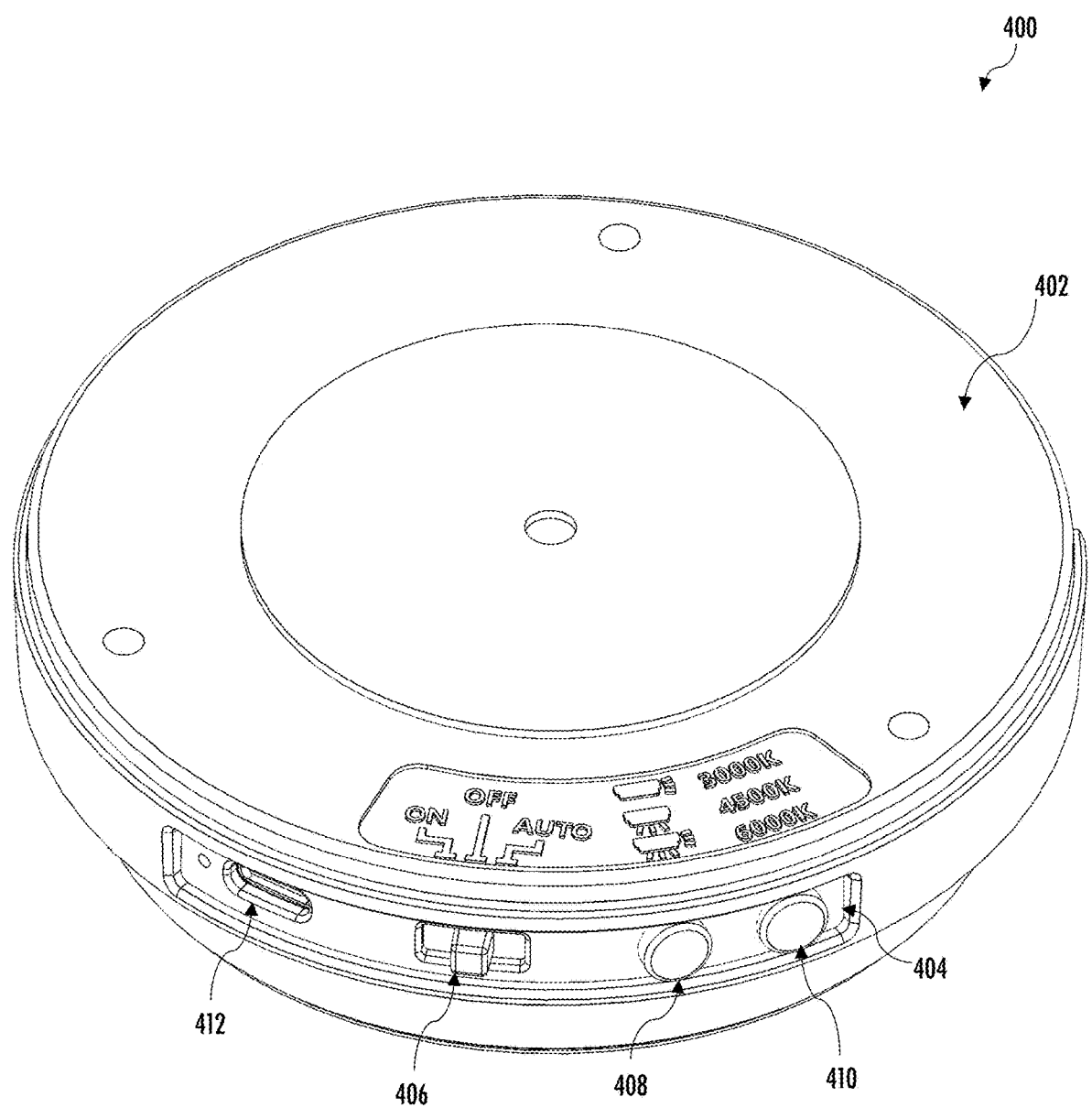
FIG. 4 is a perspective view of a motion activated light, according to aspects of the present disclosure.
Figure 5:
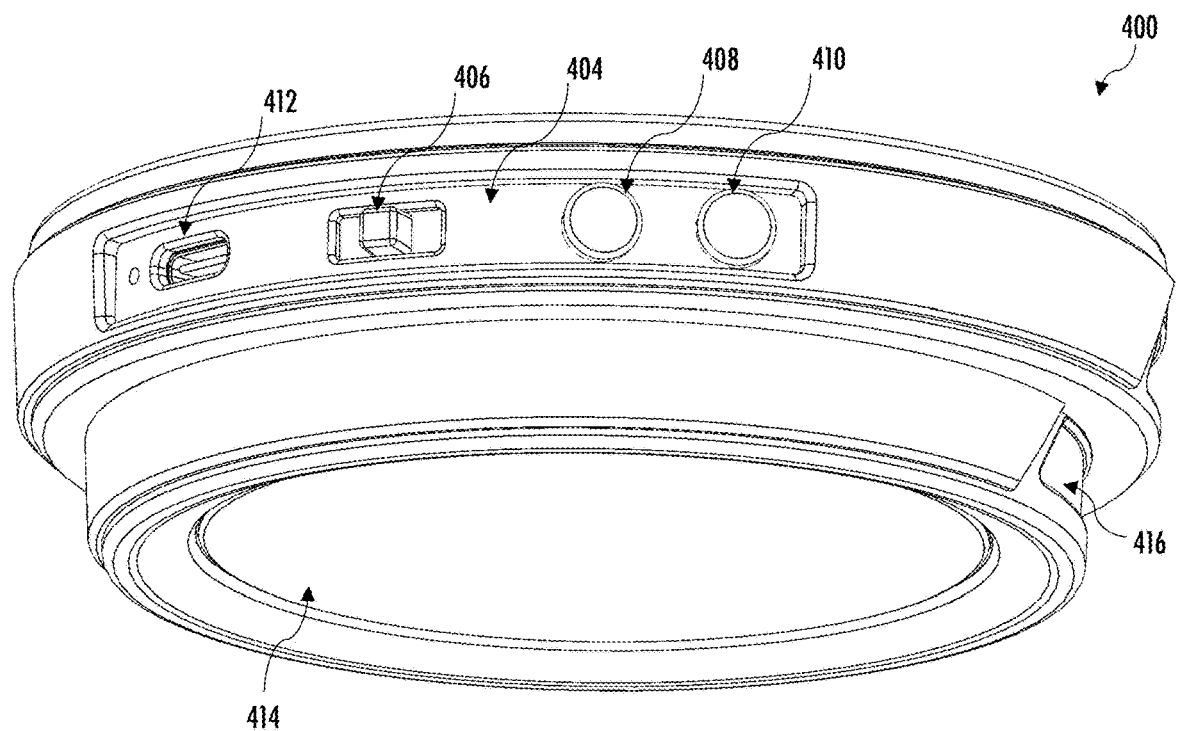
FIG. 5 is a perspective view of the motion activated light illustrated in FIG. 4.
Figure 6:
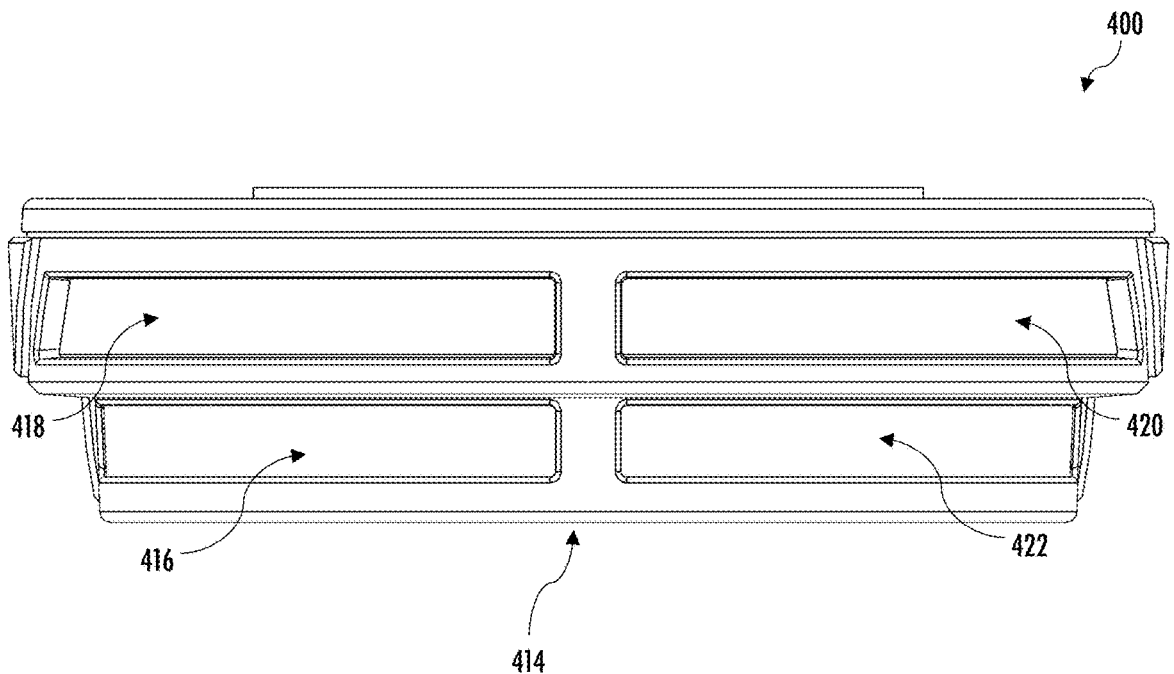
FIG. 6 is a side view of the motion activated light illustrated in FIG. 4.

Reference is now made to FIGS. 4-6. FIG. 4 is a perspective view showing a mounting-side of a motion activated light 400 according to aspects of the present disclosure. FIG. 5 is a perspective view showing a bottom light-side of the motion activated light 400 of FIG. 4. FIG. 6 is a side view of the motion activated light 400 of FIG. 4.

The motion activated light 400 includes a housing 402. In some examples, the housing may be water resistant for indoor or outdoor use. The housing 402 may include a user interface panel 404 with a power mode switch 406, a lighting mode button 408, and a color temperature mode button 410. The power mode switch 406 may have three positions, an off position that turns off the motion activated light, an on position that keeps the light on until the battery is drained, and an automatic position that activates motion sensor mode. Motion sensor mode may turn on in a dark environment when motion is detected. In the motion sensor mode, the light may turn on for a period of time (e.g., 20 seconds) upon the detection of motion and turn off when motion is no longer detected.

The lighting mode button 408 may toggle between different lighting configurations of the motion activated light 400. The motion activated light 400 may be configured to illuminate from one or more of the lens covers (bottom lens cover 414 and side lens covers 416, 418, 420, and 422) situated on the housing 402. A user may select from the lighting mode to light from the bottom of the motion activated light 400 (activating the light to illuminate through the bottom lens cover 414), the side of motion activated light 400, (activating the light to illuminate through the side lens covers 416, 418, 420, and 422) or both (activating the light to illuminate through the bottom lens cover 414 and the side lens covers 416, 418, 420, and 422). Additional lighting modes to toggle lighting to each of the side lens covers 416, 418, 420, and 422 individually may be used.

The color temperature mode button 410 may toggle between multiple color temperatures of the LEDs within the motion activated light 400. For example, the color temperature mode button 410 may toggle between a daylight 6500 Kelvin (K) mode, a 4000 K incandescent light mode, and a 3000 K warm candlelight mode.

The user interface panel 404 may include a charging port 412 where a battery within the housing 402 of motion activated light 400 may be recharged from an external power source. In some examples, the battery may last six months on a single charge allowing the motion activated light to be used regularly without recharging providing many of the benefits of a light coupled to mains power without the need to run dedicated wiring.

One or more printed circuit boards (PCBs) inside the housing 402 of motion activated light 400 may be coupled to the battery and switches/buttons within the user interface panel 404. The PCBs may be configured to control operation of the motion activated light 400. The PCBs may include a microwave-based motion sensor and an array of light emitting diode (LED) lights. The PCB may toggle through various modes based on a setting of the power mode switch 406, lighting mode button 408 and the color temperature mode button 410. An ambient light sensor on the motion activated light may allow the PCB to determine whether there is a dark environment with which motion detection should activate the LEDs in automatic power mode.

Motion activated light 400 may be configured for installation on a ceiling or a wall. The motion activated light 400 may be installed with a mounting sticker and/or on a mounting plate for easy removal. In some examples, the magnet plate is magnetized to attach to magnets within the housing 402 of the motion activated light 400. The motion activated light 400 may be installed at various orientations based on the surface or object is to be illuminated. For example, the side lighting (through the side lens covers 416, 418, 420, and 422) does not cover the entire outer circumference of the motion activated light 400. In some examples, the side lighting may be oriented towards the ground to provide path lighting (when the motion activated light 400 is mounted on a wall). In other examples, the side lighting may be oriented towards (or away) from a wall or a viewer (when the motion activated light 400 is mounted on the underside of a cabinet).

6 Exemplary Solar-Powered Motion Activated Lighting Device

Figure 7:
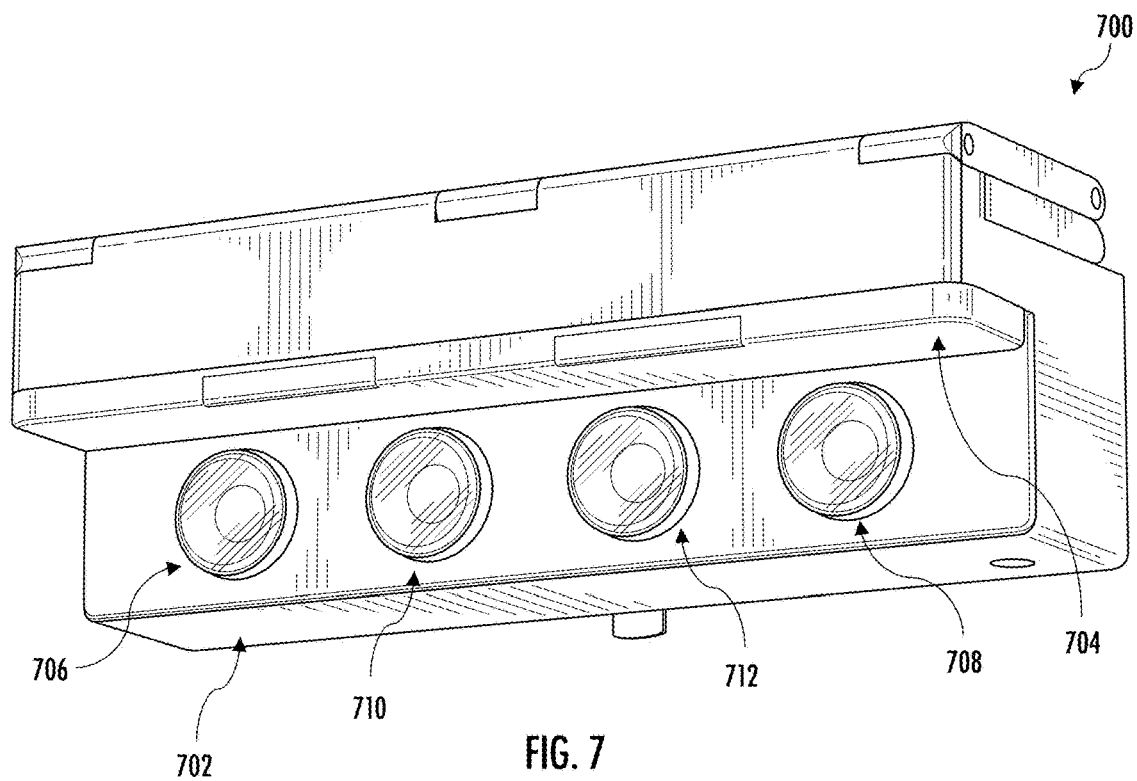
FIG. 7 is a perspective view of a motion activated light, according to aspects of the present disclosure.
Figure 8:
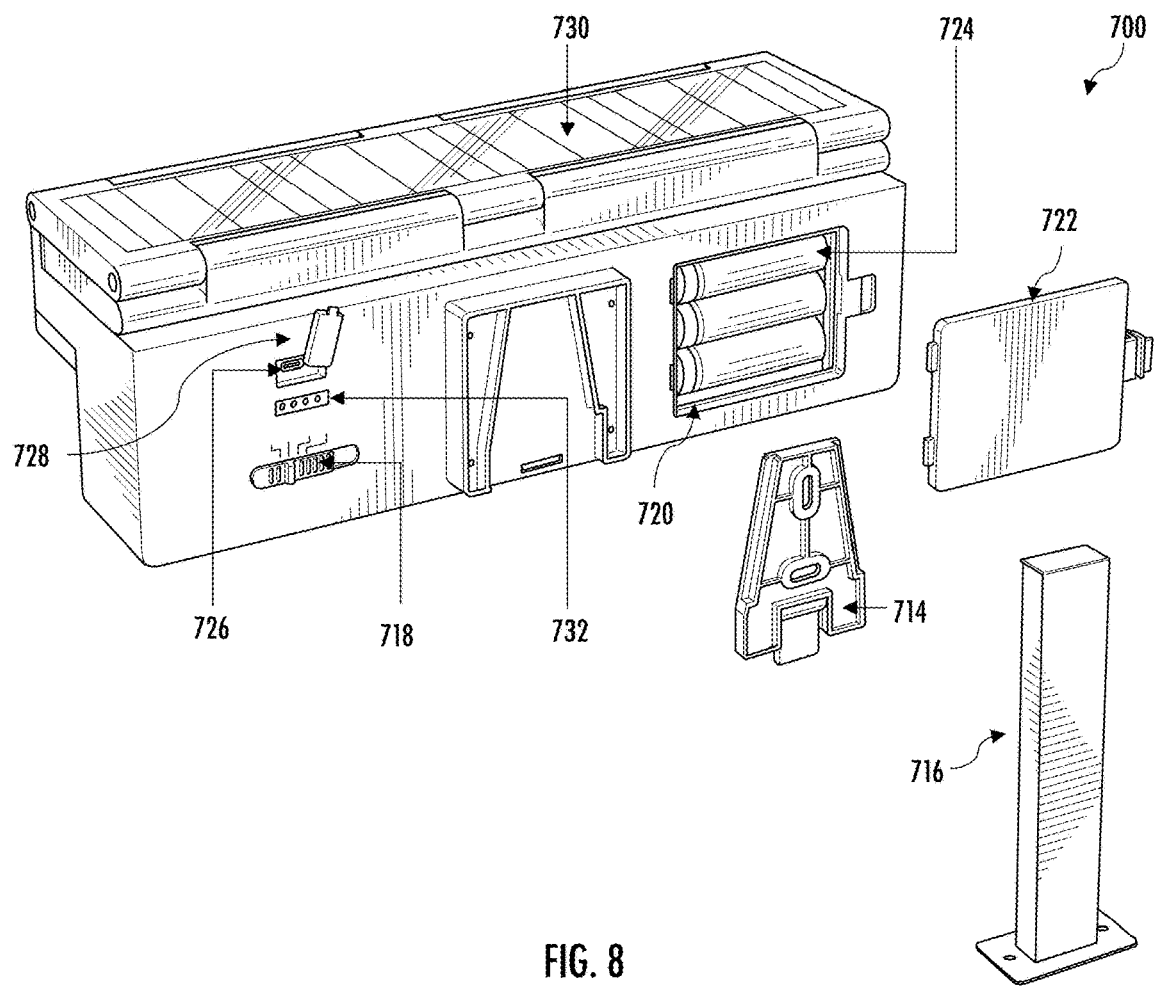
FIG. 8 is a perspective view of the motion activated light illustrated in FIG. 7.

Reference is now made to FIGS. 7 and 8. FIG. 7 is a perspective view showing a lighting face of a motion activated light 700 according to aspects of the present disclosure. FIG. 8 is a perspective view showing a controlface of the motion activated light 700 of FIG. 7.

The motion activated light 700 includes a housing 702. In some examples, the housing may be water resistant for indoor or outdoor use. Within the housing 702 is a microwave motion detection sensor. The motion activated light 700 may include multiple beam types including a down light 704, two flood beam directional lights 706 and 708, and two spot beam directional lights 710 and 712. In some examples, the spot beam directional lights 710 and 712 may illuminate up to 500 feet and the flood beam directional lights 706 and 708 may cover a 180° wide field of view and 200 foot distance.

The variety of beam types allows the motion activated light 700 to respond differently according to different types of sensed motion as well as allowing the motion activated light 700 to be installed in a wide variety of locations (as solar landscape lighting, on a building as security/flood lighting, etc.). Examples with different lighting options may be used with equal success. For example, the number or presence of down lighting or the directional light (flood beam directional lights 706 and 708, and spot beam directional lights 710 and 712) may vary for different use cases (security lighting versus landscape lighting), housing 702 sizes, etc.

To install the motion activated light 700, a mounting clip 714 may be attached to a structure (e.g., a wall) via a screw or other mechanism. The motion activated light 700 may be installed on the mounting clip 714 by mating with (e.g. slipping onto/clipping into) a configured portion of the housing 702. The motion activated light 700 may also be installed on a pedestal 716 which may be secured to the ground with bolts or other securing hardware.

The housing 702 may include a battery compartment 720 with an attachable battery compartment cover 722 configured to enclose batteries 724 in the housing 702. The battery compartment cover 722 may provide a weather-resistant enclosure for the batteries 724, while allowing the batteries 724 to be replaced as needed. The battery compartment 720 may include components (e.g., contacts, wiring, etc.) to electrically couple the batteries 724 to provide power to electrical components (e.g., a controller/PCB, lights) and charging circuitry of the motion activated light 700.

The batteries 724 may include rechargeable batteries. In some examples, the batteries 724 includes a 21700 lithium-ion rechargeable battery that may provide voltage of approximately 3.7v (e.g., 2.5-4.2v) and includes between 3000 mAh and 5100 mAh (e.g., 5000 mAh) of charge. Other batteries of a different form factor (e.g., an 18650 lithium-ion cell), chemistries (e.g., nickel-cadmium (NiCAD)) or type (e.g., AA/AAA single-use alkaline batteries) may be used with equal success based on the specific implementation and needs of the end user.

A charging assembly within the housing 702 may include a controller (e.g., a PCB) configured to control electrical/charging operation of the motion activated light 700. Circuitry on the controller/PCB may include microcontrollers, sensors, memory/data storage, charging circuitry, and/or other circuitry. The housing 702 also includes a charging port 726 where the batteries 724 may be recharged from an external power source. In some examples, the charging port 726 includes a USB-C charging port. The charging port 726 may be protected by a charging port cover 728 from weather conditions, dust, precipitation, etc. In some examples, external power received via the charging port 726 may provide power to the motion activated light 700 directly rather than for solely charging the batteries 724.

A solar panel 730 may be located on the housing 702. In some examples, the solar panel 730 may be a foldable solar panel with two amorphous or monocrystalline panels. The solar panel 730 may be configured to charge the batteries 724 via the charging assembly (or power the motion activated light 700). In some examples, the solar panel 730 may be removable and electrically coupled to the motion activated light 700 via a charging cable. The solar panel 730 may be separately affixed to a structure allowing for flexibility in the placement of the solar panel 730 (e.g., on a wall around a corner, on a roof, etc.) with respect to the motion activated light 700.

The housing 702 may have a set of indicator LEDs 732 to display the remaining capacity of the batteries 724 and/or current draw on the batteries 724. As illustrated, the four indicator LEDS 732 correspond to remaining capacity and/or current draw on the batteries 724. The indicator LEDs 732 may be enabled/illuminated according to the estimated remaining battery capacity at the current duty cycle. For instance, where two indicator LEDs are illuminated, the batteries 724 have about 50% of its capacity, 3 LEDs illuminated indicates the batteries 724 have about 75% of their capacity remaining, etc. Additionally, each LED may emit light in one of three colors that dynamically correspond to the current draw: red (high current draw), orange (moderate current draw), and green (low/no current draw). So, as an example, if the indicator LEDs 732 are lit in red, then batteries 724 have a high current draw (and is rapidly depleting). If the indicator LEDs 732 are lit orange, then the batteries 724 are under moderate use, etc.

A power selector switch 718 on the housing 702 may have a variety of mode positions to control operation of the motion activated light 700. The positions may include an off position that turns off the motion activated light, an on position that keeps the light on until the battery is drained, and an automatic position that activates motion sensor mode. Other modes may vary the type and number of lights activated as well as the color and/or temperature of the lights. For example, a down light mode the only activates the down light 704, and flood/spotlight mode that only activates the flood beam directional lights 706 and 708 and spot beam directional lights 710 and 712, and a combined mode that activates all lights on the motion activated light 700. During automatic mode operation, the motion activated light 700 may select an appropriate light or combination of lights based on the sensed motion.

For example, motion may be detected at a particular distance from the microwave motion detection sensor of the motion activated light 700, the distance corresponding to a particular zone/distance range. Based on the zone motion is detected, the motion activated light 700 may determine one or more of the following: which lights to turn on, how bright the lights should be, and for what duration the lights should be kept on. The motion activated light 700 then operates based on the determined settings by activating and deactivating the appropriate lights at the appropriate power settings.

A controller within the housing 702 may receive input from the power selector switch 718 to determine settings of the motion activated light 700. The controller may be coupled to a microwave motion detection sensor to determine whether there is movement within a threshold distance of the motion activated light 700. The controller may determine an amount of ambient light/a time of day based on an ambient light sensor (or alternatively, the solar panel 730). The controller may determine operation of the motion activated light 700 based on one or more of: the setting of the power selector switch 718, the presence/absence of motion, the distance from detected motion, an amount of ambient light, the current charge of/draw upon the batteries 724.

For example, in an automatic mode, the controller may activate the lights of the motion activated light from dusk to dawn (determined based on ambient light readings). The controller may determine which lights to activate and the brightness of the lights and/or the length of time the lights are activated may be based on the time of day, current charge of the batteries (reducing output as the batteries become depleted), user selection, and/or the zone motion was detected in.

Figure 9:
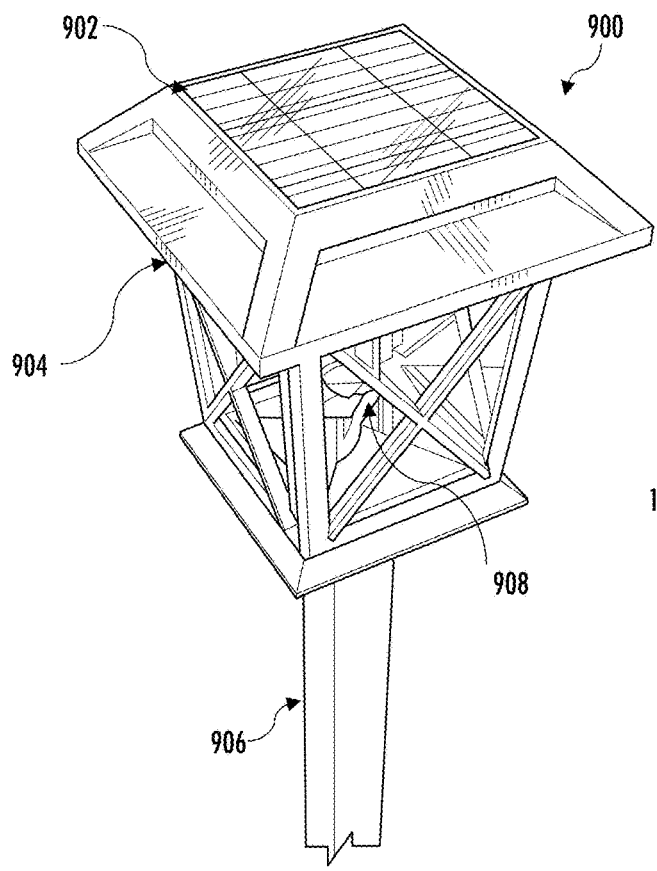
FIG. 9 is a perspective view of a motion activated light, according to aspects of the present disclosure.
Figure 10:
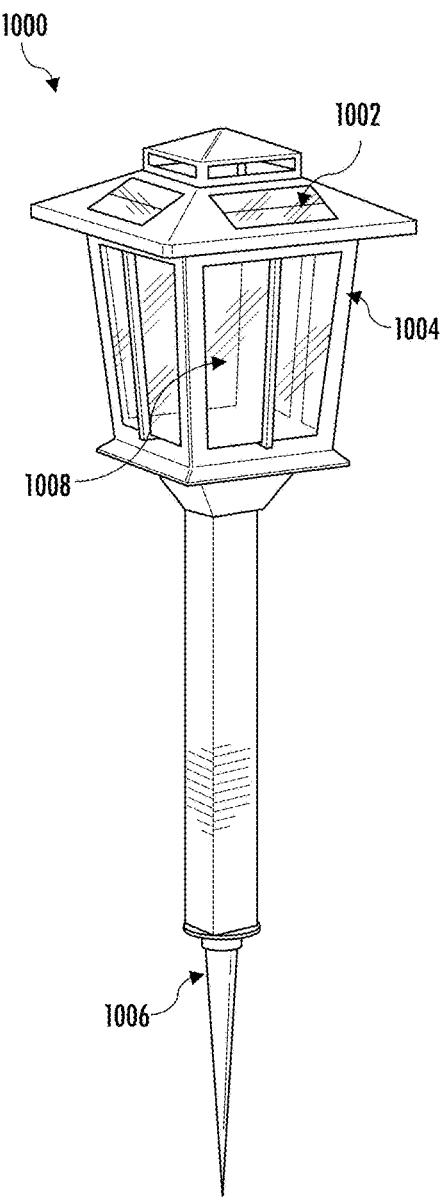
FIG. 10 is a perspective view of a motion activated light, according to aspects of the present disclosure.

Other housing designs/form factors may be used with equal success. FIG. 9 is a perspective view of a motion activated light 900. FIG. 10 is a perspective view of a motion activated light 1000. The motion activated light 900 has a lantern shape with a single solar panel 902 on the roof of the housing 904 to charge a battery within the housing 904. The motion activated light 1000 has a lantern shape with four solar panels 1002 on the roof of the housing 1004. As illustrated, the motion activated light 900 may be installed on a post 906. The motion activated light 1000 may be installed on a stake 1006 for ease of insertion into the ground. An LED 908 within the motion activated light 900 or the LED 1008 within the motion activated light 1000 may be controlled by a microwave motion detection sensor and/or an ambient light sensor within the housing 904 or 1004. A controller may use the sensor information and/or battery charge data to adjust the output of the LED 908 or 1008.

7 Exemplary Microwave Sensor

Figure 11:
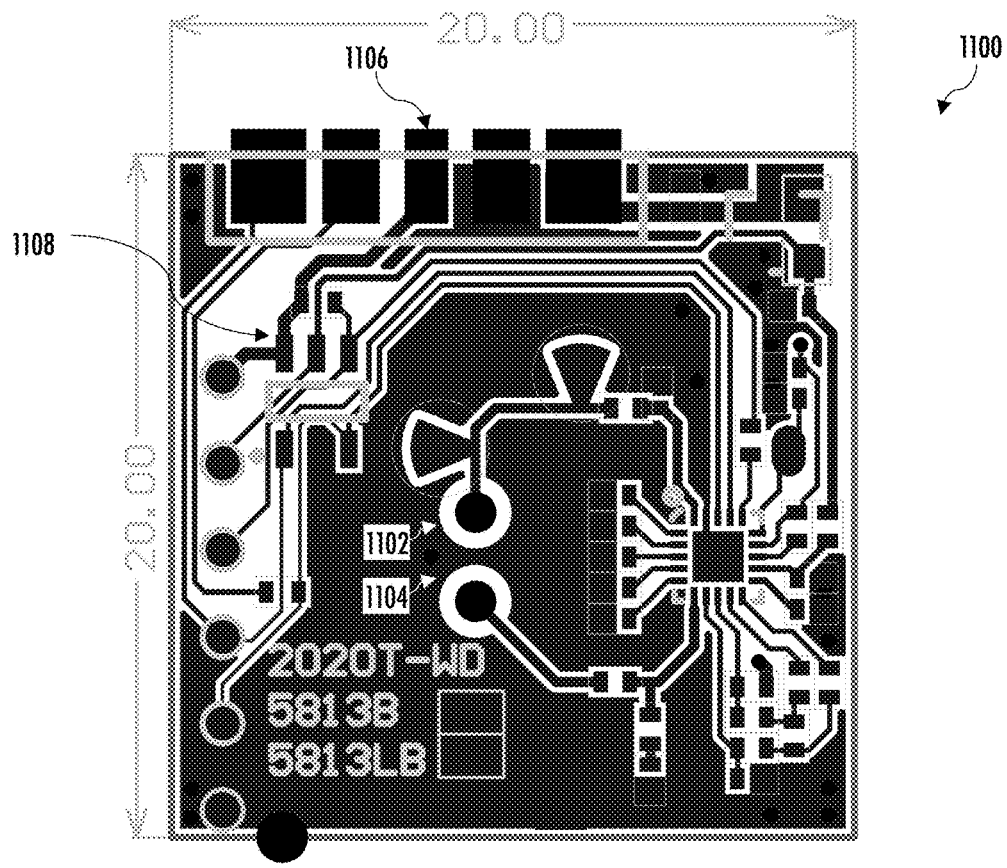
FIGS. 11 and 12 are electrical diagrams of an exemplary microwave motion detection sensor, according to aspects of the present disclosure.
Figure 12:
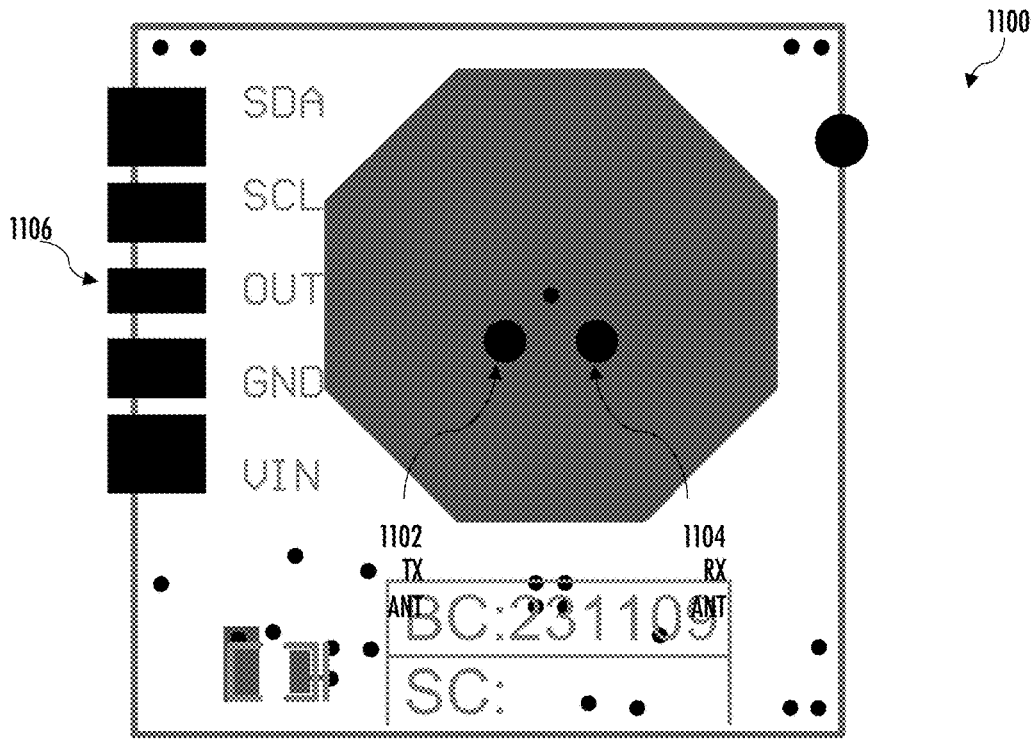

FIGS. 11 and 12 are electrical diagrams (PCB layouts) of an exemplary microwave motion detection sensor 1100 according to aspects of the present disclosure. The exemplary microwave motion detection sensor 1100 includes a transmit antenna 1102 and a receive antenna 1104. The transmit antenna 1102 is configured to transmit microwave signals to reflect off objects in the region around the microwave motion detection sensor 1100. Moving objects create a doppler shift in the reflected signal indicating motion. The receive antenna 1104 is configured to receive microwave signals reflected off objects. The received signal may be determined by the exemplary microwave motion detection sensor 1100, which may be output via the output pin 1106.

A PWM control circuit 1108 is configured to receive a control signal or reference voltage that specifies the desired duty cycle. The output of the PWM control circuit 1108 may include a periodic square wave signal with a varying duty cycle. The PWM signal typically oscillates between two voltage levels: a high voltage (Vmax) and a low voltage (often represented as 0V or ground). The output of the PWM control circuit1108 is used as input to the transmit antenna 1102 for transmission.

8 System Architecture

Figure 13:
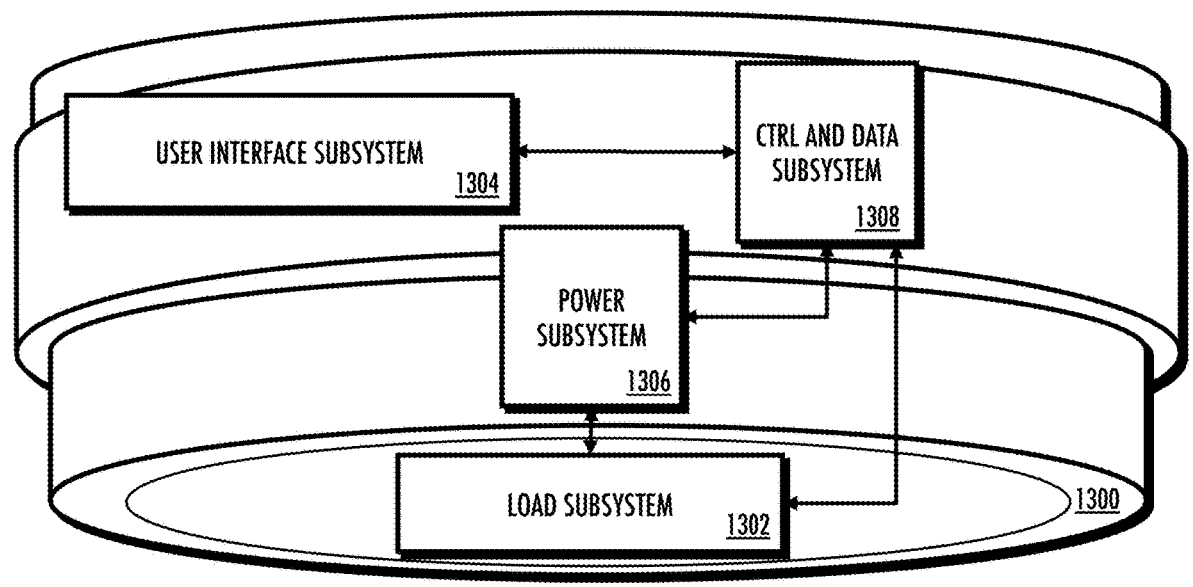
FIG. 13 is a logical block diagram of an exemplary lighting system, useful in conjunction with the various techniques described herein.

FIG. 13 is a logical block diagram of an exemplary lighting system 1300. The exemplary lighting system 1300 may include a load subsystem 1302, a user interface subsystem 1304, a power subsystem 1306, and a control and data subsystem 1308, within a housing. During system operation, the power subsystem 1306 provides power from multiple different power sources with different characteristics and/or capabilities. The control and data subsystem 1308 monitors the power subsystem 1306 and/or the load subsystem 1302 and adjusts power provisioning according to the dynamic loading activity of the load subsystem 1302. Additionally, system status and user feedback may be provided to/from the user via the user interface subsystem 1304.

While the illustrated system is presented in the context of a lighting device, the system may have broad applicability to any system using motion detection sensors. Such applications may include personal, industrial, financial, security, medical, and/or scientific devices including, e.g., radiant apparatuses (e.g., visible light, infrared, ultraviolet, etc.), acoustic systems, sensor systems (photoelectric, thermoelectric, electrochemical, electromagnetic, electromotive, etc.), electromotive systems (motors, actuators, etc.), security systems (access systems, monitoring systems), power systems (power banks, battery chargers, etc.), and/or any other portable powered apparatus.

The following discussion provides functional descriptions for each of the logical entities of the exemplary lighting system 1300. Artisans of ordinary skill in the related arts will readily appreciate that other logical entities that do the same work in substantially the same way to accomplish the same result are equivalent and may be freely interchanged. A specific discussion of the structural implementations, internal operations, design considerations, and/or alternatives, for each of the logical entities of the exemplary lighting system 1300 is separately provided below.

9 Load Subsystems

Within the context of the present disclosure, the load subsystem 1302 consumes power that is provided from the power subsystem 1306. In one aspect of the present disclosure, the load subsystem 1302 dynamically varies its load; the dynamic characteristics of the load may be monitored to select, prioritize, or otherwise inform power provisioning (controlled by the control and data subsystem 1308).

As used herein, the term "load" refers to any device or component that consumes electrical energy to perform a specific function. A dynamic load refers to an electrical load that varies its power consumption due to its operating conditions and/or the specific function it performs. A static load refers to an electrical load that has a constant power consumption.

An electrical load may be characterized according to the voltage (measured in "volts" (Joules/Coulomb)) and current (measured in "amps", (Coulombs/second)) the load uses. Power consumption is typically measured in "watts" (volts× amps=watts (Joules/second)). Notably, power consumption is a function of impedance which has two components: resistance and reactance. Resistance measures opposition to the flow of electrical current, whereas reactance measures opposition to a change in electrical current. Reactance may be further sub-divided into inductive reactance and capacitive reactance. Inductive reactance stores energy in the form of magnetic field hysteresis; thus, the change in current "lags" the change in voltage. In contrast, capacitive reactance stores energy as differences in electrical fields thus, the change in current "leads" the change in voltage. The combination of resistance (real) and reactance (imaginary) describes a complex impedance having a magnitude and phase. Notably, reactance stores, but does not consume, power-thus, reactive components are not "dynamic loads" since they do not vary their power consumption.

Electrical systems that switch in/out portions of circuitry are one type of dynamic load behavior. For example, Pulse Width Modulation (PWM) and Pulse Density Modulation (PDM) circuits may switch on/off according to different widths or densities. Other examples include electrical subsystems that can be enabled/disabled either in whole or in part. For example, gate logic and other hardware may be enabled/disabled with clock gating and/or power gating. More generally, however, any time varying load may be substituted with equal success. For example, Pulse Amplitude Modulation (PAM) may increase/decrease impedance to affect the resulting amplitude. As another such example, variable resistances may be used to adjust current flow (e.g., potentiometers and/or rheostats) of analog circuits.

The permissible static and dynamic behavior of electrical signals may be parameterized for a load in a variety of ways. The following listing is illustrative, other load parameters may be used with equal success.

A "nominal" quantity is a specified or typical quantity (e.g., voltage, current, frequency, etc.) that an electrical or electronic component, circuit, or device is designed to operate under normal conditions. It serves as a reference value for the expected value. "Maximum" and "minimum" refer to the highest and lowest values, respectively, that a component, circuit, or device can withstand without suffering damage or exceeding its rated specifications. "Peak" and "trough" refer to the highest and lowest values, respectively, that a component, circuit, or device is designed for to maintain proper operation.

An "average" quantity characterizes a quantity over time. While "average" generally refers to an "arithmetic mean" average, other averages may be substituted with equal success. A non-limiting set of examples include: median, mode, geometric mean, harmonic mean, weighted mean, trimmed mean, etc.

An "average" quantity characterizes a quantity over time. While "average" generally refers to an "arithmetic mean" average, other averages may be substituted with equal success. A non-limiting set of examples include: median, mode, geometric mean, harmonic mean, weighted mean, trimmed mean, etc.

A "duty cycle" describes the fraction of time during which a periodic signal (such as a pulse or waveform) is in an active state compared to its total period. For example, an 80% duty cycle (sometimes also referred to as an 80/20 duty cycle) refers to a signal that is on for 80% of the cycle (and off for 20% of the duty cycle).

A "slew rate" refers to the rate at which a signal changes over time. For example, slew rates for voltages are often expressed as volts/microsecond.

A "spectral envelope" is a representation of the amplitude characteristics (magnitude) of the frequencies present in a signal or spectrum. It provides information about the dominant frequency components of a signal. A "roll-off frequency" is the point in a frequency response at which the amplitude or power of the signal begins to decrease rapidly. It is typically defined as the frequency at which the response is reduced by a certain amount, often measured in decibels.

The following discussions provide several illustrative embodiments of dynamic loads, however, artisans of ordinary skill in the related arts given the contents of the present disclosure will readily appreciate that the virtually any dynamic load may be substituted with equal success.

9.1 Transducer Components

As used herein, the term "transducer" and its linguistic derivatives refer to components that convert (transduce) energy from a first form to a second form. Forms of energy may include electrical, magnetic, chemical, mechanical, acoustic, optical, thermal, radio, etc. For example, an RF antenna is an example of an electromagnetic transducer (converting electromagnetic waves to/from electrical energy), a speaker is an example of an electroacoustic transducer (converting electrical energy to/from acoustic waves), an LED is an example of an electro-optical transducer (converting electrical energy to incoherent light), etc. Various embodiments of the load subsystem convert (transduce) electrical energy into another form to perform its task; dynamic transduction may entail dynamic loading.

In one embodiment, the load subsystem transduces electrical energy to electromagnetic radiation. EM radiation refers to oscillating electric and magnetic fields that propagate together in the same direction, perpendicular to one another. For example, the load subsystem may be a light module that generates visible light. The light module may include a bulb (incandescent, halogen), light emitting diode (LED), gas-discharge lamp (fluorescent tubes, neon, sodium vapor), lasers, or other light generating device. A bulb includes a wire filament enclosed in a vacuum or inert gas; the resistance of the filament is used to convert electrical energy to heat and light. An LED is composed of a diode junction manufactured from semiconductors with specific electroluminescent properties (e.g., gallium arsenide (GaAs), gallium phosphide (GaP), etc. When electrical energy is applied to the diode junction, electrons are forced to combine with electron holes; this process converts some electrons to photons (light). Gas-discharge lights pass electrical energy through ionized gasses; the ionized gases have quantum energy states so excess energy is released as EM radiation. The EM radiation is absorbed by a phosphor coating, which re-emits it as visible light. Lasers (light amplification by stimulated emission of radiation) use electrical energy to stimulate a gain medium (e.g., gas, liquid, solid); once energized, some atoms of the gain medium emit radiation. The emitted radiation triggers other atoms of the gain medium to emit more radiation; resulting in a rapid amplification of coherent light. The gain medium lies in a resonant cavity of the laser which allows continued amplification even as some portion of the light are output.

In addition to the light generating element, the light module may incorporate passive lenses, diffusers, reflectors, waveguides, and/or any other components or combinations of components configured to direct or disperse the light. For example, lenses are typically manufactured from a transmission medium (e.g., glass, acrylic, polycarbonate, etc.) which has been physically formed to bend (refract) light as it passes through. The lens physical shape may be convex (that causes light to converge), concave (that causes light to diverge), or a piecewise combination. In some applications, multiple lenses may be used in combination to provide refraction characteristics that are not possible (or practical) to implement with a single lens. Diffusers scatter, spread, and/or soften light as it passes through. Examples of diffusers include e.g. diffuser films, prisms, or translucent materials (e.g., frosted glass/acrylic, etc.). Reflectors reflect some (or all) of the light; reflectors are often used to direct light in a particular direction. Reflectors can be made from a wide range of materials, including metals, glass, plastics, and specialized coatings designed for specific wavelengths or applications. The design and geometry of a reflector determine its reflective properties and how it redirects or concentrates light. Waveguides use internal reflection to guide and confine light from one point to another; typical examples of waveguides include e.g. fiber optics for light as well as microwave waveguides and radio waveguides.

More generally, while the foregoing discussion is presented in the context of visible light applications (e.g., security lighting, lanterns, flashlights, head lamps, work lights, etc.), any EM radiator (and associated peripherals) may be substituted with equal success. EM radiation spans a very wide spectrum from e.g., radio waves, microwaves, infrared (IR) or heat, visible light, ultraviolet (UV), x-rays, gamma rays, etc. Such devices may include e.g., telecommunications radios, microwave transmitters/ovens, IR transmitters/elements, UV lamps, X-ray lamps, etc.

In one example, the exemplary lighting system 1300 may server as a speaker for playing music, a speaker and microphone "intercom" for hands-free cellphone operation, a device hub, an external hard drive for storing/transferring media, etc. Media playback assemblies may include associated components: e.g., a wired/wireless interface (e.g., USB™, Bluetooth®, Wi-Fi™, etc.), codecs, user interfaces, screens, speakers, and/or microphones.

In one embodiment, the load subsystem 1302 transduces electrical energy to acoustic waves. An acoustic wave is a mechanical wave that propagates through a physical medium (air, water, solids, etc.) by causing particles in the medium to oscillate or vibrate. In one implementation, the load subsystems 1302 include a moving-coil speaker module that generates audible sound. Such speakers include a diaphragm (cone) that is attached to a coil, and magnet. When an electrical current passes through the coil, the coil generates a magnetic field that interacts with the magnet, causing the coil (and diaphragm) to move. Oscillating the diaphragm within certain frequency ranges and at sufficient magnitudes results in audible sound. Other examples of speakers include electrostatic speakers and planar magnetic speakers. Electrostatic speakers move an electrically charged diaphragm between perforated metal plates by changing the electrical charge of the plates. Planar magnetic speakers move a magnetic diaphragm using an electrically induced magnetic field. Each of these speaker technologies transduces electrical energy into acoustic waves.

Audio devices may include without limitation: audio/visual (AV) players (e.g., laptops, portable stereos, etc.), personal communication devices (e.g., walkie-talkies, smartphones, etc.), home/professional entertainment systems, public address systems, voice assistants, and/or any other personal, industrial, financial, medical, and/or scientific devices that employ audible sound.

Furthermore, much like light, acoustic waves exist on a spectrum that includes infrasound, audible sound, and ultrasound. While the foregoing selection describes audible acoustic applications, non-audible acoustic applications may use other forms of transduction. For example, ultrasonic transducers apply electrical current to piezo-electric elements to vibrate and generate ultrasonic acoustic waves. Ultrasonic waves are used for a variety of medical and industrial applications. Similarly, infrasonic waves may be generated by motors/vibrators; infrasound travels well in liquid/solid mediums and has applications in seismology and/or petroleum exploration, etc.

In one embodiment, the load subsystem 1302 converts electrical energy to mechanical movement. Typically, electro-mechanical movement uses electrical current in combination with permanent magnets to create attraction/repulsion forces. These techniques are commonly used in relays, solenoids, electric motors, stepper motors, linear actuators, servo motors, etc. Mechanical movement may include regular movements such as linear motion, reciprocating motion, rotary motion, oscillatory motion, as well as irregular movements such as cam-based motion, linkages, and eccentric motion.

Electro-mechanical devices may include without limitation: consumer electronics, hand tools and power tools (e.g., drills, screwdrivers, saws, sanders, routers, impact drivers, sprayers, heat guns, nail guns, rotary tools, random orbital sanders, and/or any other similar tools), and/or any other personal, industrial, financial, medical, and/or scientific devices that employ mechanical motion. While the foregoing selection describes electro-mechanical applications for hand-operated applications, artisans of ordinary skill in the related arts will readily appreciate that electro-mechanical motion may also be used in robotics, transportation, industrial automation, and/or drone-based applications. Such applications may also incorporate electro-mechanical transducers of extraordinarily small (or large) scale, such as piezo-electricity, nanotechnologies, etc.

While the foregoing discussion provides several illustrative transduction technologies, virtually any transduction technology with dynamic loading may be substituted with equal success, given the contents of the present disclosure.

9.2 Signal Processing Components

Aspects of the present disclosure may be used in conjunction with dynamic loads of signal processing. Signal processing refers to techniques that manipulate, analyze, and interpret electrical signals, which are representations of data in either analog or digital form. Functionally, semiconductors consume power during operation due to internal resistances. As a result, the dynamic loads associated with signal processing are a function of e.g., processing complexity (e.g., data size, compute cycles, memory accesses, etc.), dynamic behavior (e.g., enable/disable, load balancing, etc.), and/or application considerations (e.g., real-time budgets, best-effort processing, etc.).

As used herein, the term "real-time" refers to tasks that must be performed within definitive time constraints; for example, a video camera must capture each frame of video at a specific rate of capture. As used herein, the term "near real-time" refers to tasks that must be performed within definitive time constraints once started; for example, a smart phone must render each frame of video at its specific rate of display, however some queueing time may be allotted for buffering. As used herein, "best effort" refers to tasks that can be handled with variable bit rates and/or latency. As but one such example, a user that wants to view a video on their smart phone can wait for the smart phone to queue and post-process video.

In one embodiment, the load subsystem 1302 includes a signal processor that manipulates electrical signals in the analog domain. In other words, information is conveyed via voltage and/or current. Functionally, analog processing may consume power to amplify/attenuate and/or synthesize intermediate signals and waveforms. Examples of analog processing signal include without limitation: amplification/attenuation, filtering, modulation/demodulation, signal conditioning, analog-to-digital (ADC)/digital-to-analog (DAC) conversion, automatic gain/frequency control (AGC/AFC), waveform synthesis, voltage/current regulation, mixing, phase shifting, isolation, equalization, and/or any other such operation. Analog signal processing is commonly used in sensors, telecommunications, audio processing, instrumentation, control, and any number of digital signal processing applications.

In one embodiment, the load subsystem 1302 includes a signal processor that switches between operational modes (enables/disables circuitry) to perform signal processing. For example, a multicore processor may shift processing burden between cores (disabling a first core, transferring data, enabling a second core). Similarly, a processor may enable/disable processing elements between different power states (idle, low power, sleep, etc.). As another example, modems often wake-up to respond to communication requests (which could occur at any time), and sleep to save power when not in use.

As a related corollary, in "fixed-width" processing embodiments, data is processed using a fixed number of bits, such as 8, 16, 32, or 64 bits, etc. However, some embodiments may support "variable-width" processing and/or variable-length encoding which dynamically adjust the number of bits used to represent and process data based on the needs of a particular computation. This can be particularly useful for computational and/or memory efficiency. In other words, unnecessary computations may be avoided and/or unnecessary precision can be disregarded (e.g., saving memory space, reducing data transfers, etc.). Variable-width processing may be particularly useful in applications where lossy data is acceptable; examples include communication protocols, media playback, and/or neural network computing.

In one embodiment, the load subsystem 1302 includes a signal processor that adjusts the operation of its gate-level circuitry. As a brief aside, gate-level circuitry refers to digital electronic circuits at the most fundamental level, where digital signals are represented with electrical voltages and drive currents (e.g., a Boolean "0" corresponds to GND voltage, a Boolean "1" corresponds to VCC voltage, etc.). So-called combinatorial logic emulates logical gates (e.g., AND gates, OR gates, NOT gates, NAND gates, NOR gates, XOR gates, XNOR gates, etc.). One example of an operational change that affects the power consumption of the signal processor is the voltage level (which may affect the robustness and reliability of transitions between logical levels). Sequential gates store logical values as electrical charges (e.g., registers, flip-flops, memory, and/or any other non-transitory computer-readable media). Operational changes that affect sequential gate logic include clock rate and/or drive current; in some cases, increasing/decreasing drive current may be used to enable faster clock rates and/or longer signaling distances.

The aforementioned techniques (switching operational modes, changing gate-level circuitry, and/or changing data sizes) are used in many computing devices including without limitation e.g., controllers, general-purpose processors, graphics processors (GPUs), neural network processors (NPUs), image signal processors (ISPs), digital signal processors (DSPs), modems, networking processors, field programmable gate arrays (FPGAs), codecs, application specific integrated circuits (ASICs), and/or any other semiconductor logic. Such computing devices may be combined with other circuitry (e.g., data storage circuitry, sensors, other signal processing components) on one or more printed circuit boards (PCBs) within a device. Such components are often found in devices such as: computers, smartphones, laptops, terminals, servers, workstations, etc. While the foregoing discussion is primarily presented in the context of embedded and portable devices, the concepts may be broadly applied to any signal processing application that may need to dynamically adjust operation based on its power source.

9.3 Energy Transfer Components

Aspects of the present disclosure may be used in conjunction with energy transfer applications. Energy transfer technologies move energy from one device to another device, or store energy in another form for storage/delivery. The conservation of energy is a fundamental principle of physics that prevents energy from being created or destroyed in a closed system (e.g., the energy donor and energy recipient), however practical implementations have some efficiency losses due thermal waste, frictional losses, etc. Examples of energy transfer applications include for example: charging a battery, wireless power transfer, etc.

The energy transfer techniques described above are used in portable chargers, battery packs, power banks, jump starters, generators, and/or other power sources. In many cases, these devices may charge other devices such as smartphones, laptops, cameras, hand tools, power tools, car batteries, and/or other powered devices. These power storage devices are commonly used by working professionals, travelers, outdoor enthusiasts, and/or any other work application where access to power is limited. In one embodiment, the load subsystem 1302 of the exemplary lighting system 1300 delivers power to another device (e.g., an attached device, an external sensor, etc.). For example, the exemplary lighting system 1300 may provide energy to another device (or devices) via a wired or wireless interface. Examples of wired interfaces include, without limitation: Universal Serial Bus (USB) and its derivatives, Lightning®/Magsafe®, charging contacts and charging rings, and any other proprietary charging interfaces, barrel connectors and AC plugs, etc. Wireless charging interfaces include, without limitation: inductive charging, magnetic resonance charging, RF charging, ultrasonic charging, beamforming and/or resonant coupling, etc. In some examples the exemplary lighting system 1300 may provide energy to multiple external devices.

10 User Interface Subsystem

Functionally, the user interface subsystem 1304 conveys (outputs) information to the user in visual, audible, and/or haptic form. Similarly, the user inputs information via physical or virtual interactions. The following discussions provide several illustrative embodiments of user interfaces, however, artisans of ordinary skill in the related arts given the contents of the present disclosure will readily appreciate that the virtually any user interface may be substituted with equal success.

User interfaces often incorporate mechanical elements including, without limitation: buttons, switches, knobs, levers, dials, joysticks, keyboards, mice, pedals, handles, and/or any other physical components that users may interact with to provide information to the system. For example, a user may press a physical button, click on an icon using a mouse, input text via a keyboard, etc.

User interfaces often incorporate visual elements, including without limitation: light emitting diodes (LEDs) and variants (e.g., OLEDs, MicroLEDs, etc.), liquid crystal displays (LCDs) and their variants (quantum dot displays (QLED), etc.), e-paper, cathode ray tube (CRT), projection displays, etc. In many cases, these visual elements may be used alone, or in conjunction with other modalities of input/output, for communication. As but one example, a set of light emitting diodes (LEDs) may be used to convey the estimated remaining voltage and charge of a corresponding set of batteries, based on position, color, intensity of illumination, and/or rate of blinking, etc. As another example, a graphical user interface using a virtual "desktop" may be displayed on a screen or touchscreen. The user may interact with icons on the desktop using a mouse and input text commands with a keyboard to see current power status (e.g., clicking on a battery icon opens a current estimated remaining voltage and charge for each battery, etc.).

Some user interfaces incorporate sound and/or audible information. For example, sounds and/or audio may be presented to the user (or captured) via a microphone and speaker assembly. In some situations, the user may be able to interact with the device via voice commands to enable hands-free operation.

Certain user interfaces incorporate motion and/or spatial information. For example, rumble boxes and/or other vibration media may provide haptic signaling. Cameras, accelerometers, gyroscopes, and/or magnetometers may be used to sense the user's physical motion and/or orientation to enable gesture-based inputs.

Most user interfaces incorporate multiple modalities of input. For example, augmented reality (AR) and/or virtual reality (VR) environments have been used in head-mounted apparatus (helmet, glasses, etc.). Such devices often incorporate visual, audio, and/or haptic information to the user.

Within the context of the present disclosure, system status and user feedback may be provided to/from the user via the user interface subsystem 1304 (controlled by the control and data subsystem 1308).

11 Power Subsystem

As a brief aside, a "closed" electrical circuit provides a path for electric current to flow from a power source across a load; an "open" electrical circuit means that the path from a power source to a load has a gap which prevents the flow of electrical current. As previously alluded to, early electronics were designed for just a single power source and often directly connected power sources to the load, e.g., a battery might directly drive a bulb. Selectively providing power from multiple different power sources requires careful management of both the load requirements and the source output to prevent e.g., voltage/current mismatch, chemistry rate mismatch, capacity mismatch, etc.

Functionally, the power subsystem 1306 connects one or more power sources to the load subsystem 1302. In addition, the power subsystem 1306 may also provide conditioning to compensate for differences between the required and provisioned electrical characteristics. For example, the power subsystem 1306 may ensure that the voltage and current provided from the selected batteries, solar cell, fuel generator, outlet, charging device, etc. match the load requirements in terms of nominal values, rate of use, frequency, etc.

Much like the load subsystem 1302, the power sources of a power subsystem 1306 may also be characterized with source parameters. For example, source parameters for a battery might include its nominal voltage, maximum/minimum voltage, maximum current draw, etc. As a practical matter, many types of power sources do not provide information about their internal operations; for example, a battery may have a nominal voltage but the remaining charge is unknown. Similarly, a solar cell might provide power according to light which may vary, or an AC wall circuit might be shared with other loads.

Various embodiments of the present disclosure further characterize the power sources of a power subsystem with characteristic functions. As used herein, the term "characteristic function" and its linguistic derivatives refers to a relationship between known and unknown quantities. For example, the measurable initial voltage across the terminals of a battery may be used to estimate the unknown remaining charge of the battery. Similarly, the voltage/current and/or line noise of an AC power supply may be used to characterize the unknown loads that are sharing the circuit, etc. Characteristic functions may be empirically determined, based on historic data, defined by manufacturer, user, vendor, etc. More directly, any technique for estimating an unknown quantity from observable quantities maybe substituted with equal success.

11.1 Power Sources and Storage

Power sources may be characterized by their output voltage and maximum supported current draw. As previously noted, power sources cannot provide voltage/current according to idealized curves. For example, a typical battery may have been specified to a nominal voltage and total capacity (number of Coulombs), however, limitations of the battery chemistry and parasitic impedances will affect the actual maximum output current. Similar limitations exist for other forms of power generation (e.g., solar power, outlet power, fuel cells, etc.). Thus, different power sources may have different utility for meeting the dynamic needs of the load subsystem.

11.1.1 Single-Use and Rechargeable Batteries

Compared to rechargeable batteries, single-use batteries store charge longer in extreme temperatures and when not in use (the so-called "self-discharge rate" is the rate at which the stored charge in a battery is reduced due to internal chemical reactions of the battery). Certain types of alkaline batteries, for example, have a shelf life of ten years. Single-use batteries are therefore well suited for emergency-use applications.

Single-use batteries must be replaced after use, thus a cost comparison of single-use batteries and their rechargeable counterparts should consider replacement cost and access to recharging power. Many high-power output products today consume single-use batteries in just a few hours, and performance is frequently inferior to rechargeable batteries at low battery life. Replacement costs can quickly eclipse the low per unit cost of single-use batteries. Further, rechargeable batteries, while having a larger up-front cost than single-use batteries, can be recharged with relatively inexpensive power from, e.g., an outlet. As a result, rechargeable batteries allow for more cost-effective use over their lifetime.

Most batteries use one or more electrochemical cells to store energy as a chemical potential between reactants. During discharge, a chemical reaction converts high-energy reactants to lower-energy products, and the free-energy difference is delivered to the external circuit as electrical energy. Rechargeable battery chemistries allow for both charging and discharging cycles (e.g., charging the cell reverses the chemical process). Batteries come in a variety of sizes and chemistries. Examples of battery chemistries include, without limitation: alkaline, lithium-ion, lead-acid, nickel-cadmium, nickel-metal hydride, lithium polymer, zinc carbon, silver-oxide, zinc-air, sodium-ion, etc. Commonly available single-use sizes include without limitation: AA, AAA, C, D, etc. Rechargeable batteries are available in the legacy cell formats, but also have new formats such as: 10440, 14500, 18650, 26500, 32600, etc.

In one embodiment, the power subsystem 1306 uses batteries to store power. In some variants, exemplary lighting system 1300 may house multiple power sources of different types and sizes. For example, exemplary lighting system 1300 may have a combination of rechargeable and single-use (dry cell) batteries. The rechargeable batteries may be removable or permanently affixed. The batteries may be stored and used in a removable battery cartridge (housing). While some battery cells may each provide approximately 1.5V, the differences in their individual capacities, discharge rates, and chemistries may be suited to certain tasks. For example, the AA cells may be useful for low intensity, short duration tasks (e.g., low illumination settings, soft background music, etc.). D cells may allow for high intensity, long duration tasks (e.g., high intensity lights, klaxon alarms, public address volumes, etc.). The rechargeable cells may be suitable to offload tasks and lengthen the usable life of the single-use cells. In some cases, the rechargeable cells may be charged in device when external power is available e.g., via holster, solar cells, AC adaptors for outlets, etc.

In some implementations, the power subsystem 1306 may incorporate internal batteries. Internal batteries are an integral part of the system's structure and are typically not removeable without e.g., specialized tools, voiding the device warranty, etc. Internal batteries are often used to e.g., support specialized power requirements, enable aggressive design form factors, incorporate proprietary technologies, and/or to reduce the cost of single-use/disposable type devices. In some implementations, the power subsystem 1306 may include housings and connection interfaces to allow for external battery connections; this allows the user to remove and replace batteries. Still other implementations may include both internal and external battery components.

While the foregoing discussion is presented in the context of electro-chemical cells, the concepts are broadly applicable to any power storage apparatus. Examples of other electro-chemical techniques include, e.g., generators and fuel cells that consume fuel to generate electrical energy. Furthermore, the power subsystem 1306 may incorporate other sources of power such as electro-optical cells (solar cells), electrical interfaces (e.g., wall socket power), and/or any other source of power.

11.1.2 Dynamic Loading of Power Sources

Some products have implemented dynamic loading capabilities-dynamic loading potentially offers better performance, longer battery life, and/or improved functionality. So-called Pulse Width Modulation (PWM) is one example of a dynamic loading strategy. Consider a PWM implementation that powers a Light Emitting Diode (LED) according to a selectable duty cycle. Specifically, the anode of the LED may be connected to the positive end of the battery source and the cathode of the LED may be connected to the drain of an N-Channel metal-oxide-semiconductor field-effect transistor (NMOSFET) switch. The source of the NMOSFET is connected to ground, and the gate is opened and closed by the PWM signal. The perceived brightness of the light is based on the duty cycle, e.g., 100% duty is the maximum brightness, 0% duty is off. Artisans of ordinary skill in the related arts will readily appreciate that other dynamic loading schemes provide similar behavior; these schemes may include e.g., Pulse Density Modulation (PDM), Pulse Amplitude Modulation (PAM), and other duty cycle-based modulation techniques.

Dynamic loading schemes provide substantial benefits over resistive dimming alternatives. NMOSFETs do not burn power during their off cycle which reduces power consumption and heating; this allows devices to stay cooler and last longer. Also, an NMOSFET is cheaper and smaller compared to power resistors. Unfortunately, these savings come at the cost of voltage stability, may also increase noise in the system.

Figure 14:
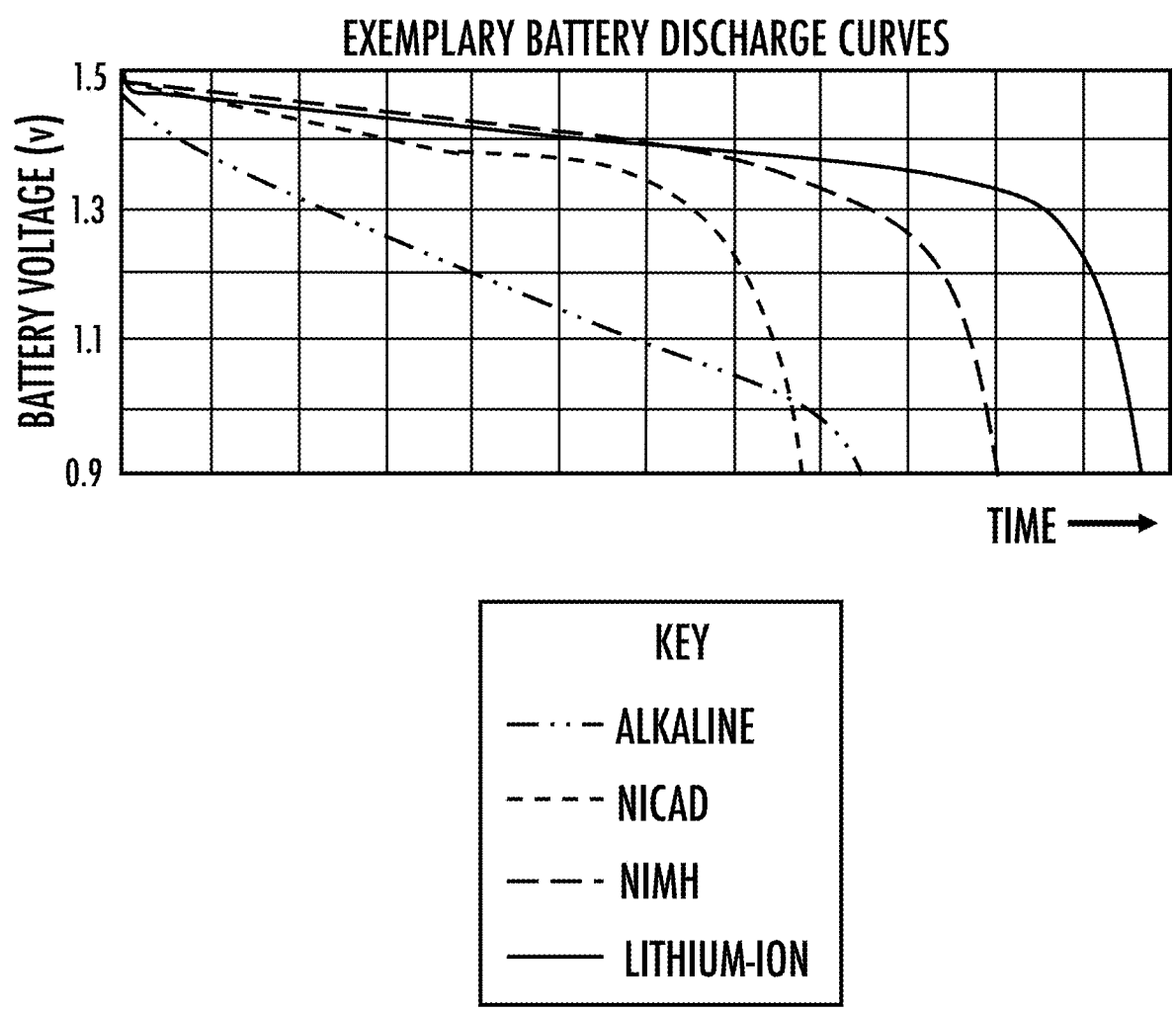
FIG. 14 is a graph illustrating exemplary discharge curves for single-use and rechargeable batteries.

As an important tangent, FIG. 14 is a graph illustrating exemplary discharge curves for single-use and rechargeable batteries. The graph illustrates the discharge curves (voltage) of four types of battery chemistries over time of use. Alkaline manganese dioxide (alkaline) batteries are single-use batteries. Nickel-cadmium (NiCAD) batteries, nickel-metal hydride (NiMH) batteries and lithium-ion batteries are rechargeable batteries. Even though all battery chemistries lose voltage over time, alkaline batteries (which are the most popular type of single-use battery) lose voltage at an almost constant rate over the span of discharge. Rechargeable battery chemistries lose voltage at a far slower rate, and drop-off before the battery is depleted. Conventional wisdom suggests that the differences in discharge rates means that single-use and rechargeable cells should not be directly electrically coupled together, since this may cause the cells to load one another unevenly and/or may reduce output, damage the cells, and in extreme cases, cause rupture and cell leakage.

The relatively constant rate of discharge for alkaline batteries simplifies battery-life determination compared to other battery chemistries; the remaining alkaline battery life can be directly estimated based on the output voltage (when not under load). In contrast, rechargeable battery chemistries can provide a relatively more consistent voltage level but may require more complex battery life determination (e.g., based on draw, temperature, usage, etc.).

Figure 15:
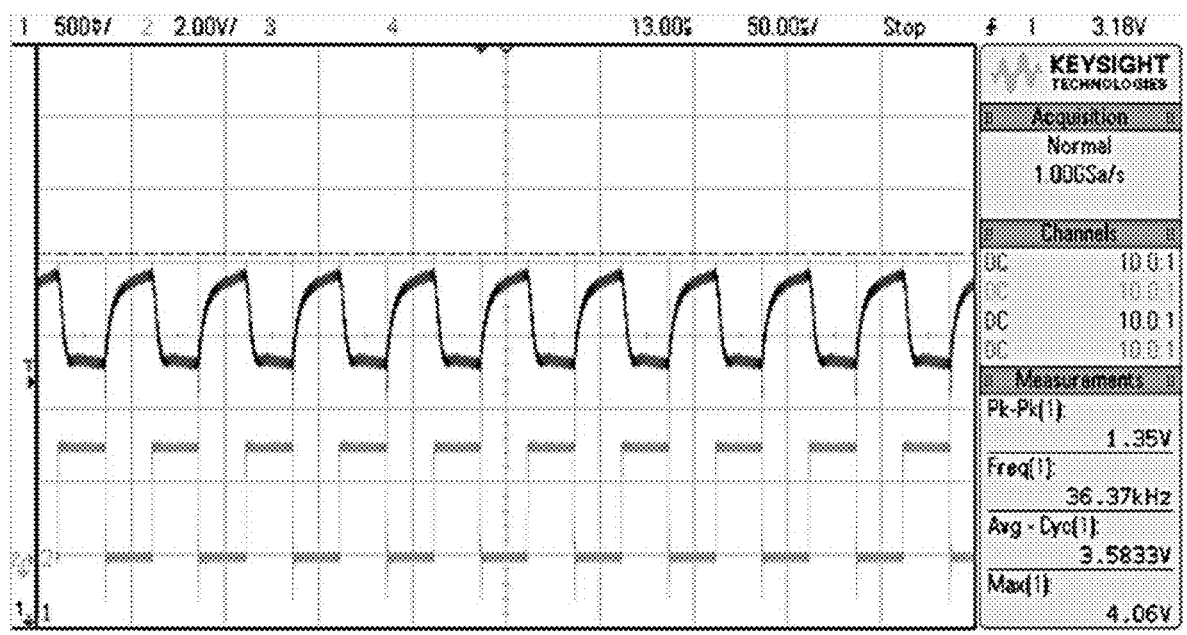
FIG. 15 illustrates voltage measurements for a Pulse Width Modulated (PWM) Light Emitting Diode (LED), useful to illustrate battery capacity measurements under dynamic loading conditions.
Figure 15:
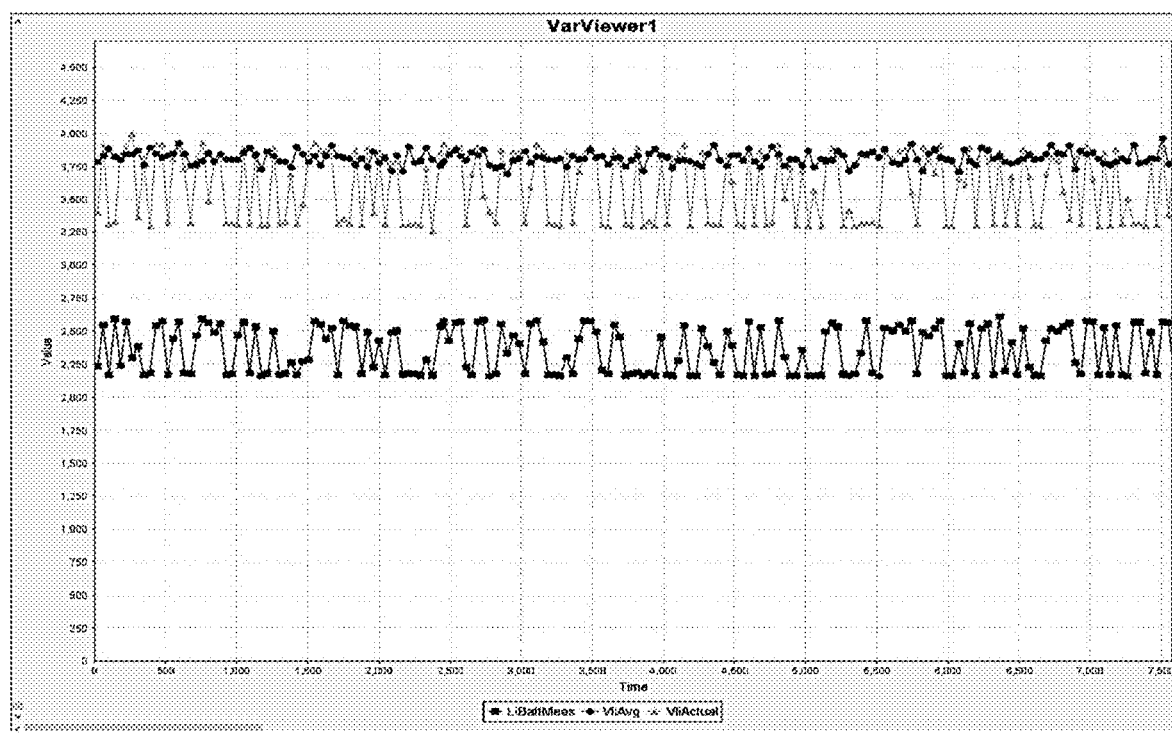

FIG. 15 shows a PWM LED implementation useful to illustrate battery capacity measurements under dynamic loading conditions. As shown, an NMOSFET gate is driven on/off at a 50% duty cycle. The battery and circuitry may also have internal resistances (R) and capacitances (C) which affect the rising and falling edges; for example, a square wave input will generate a rounded wave as the resistor-capacitor (RC) circuit charges and discharges (this effect may also be referred to as "$1^{st}$ order decay").

Battery capacity can be accurately measured based on Coulomb counting and battery voltage measurements. Unfortunately, these solutions are often cost prohibitive for low-cost applications. More cost-effective alternatives estimate the remaining charge based on the known discharge curve of the battery chemistry (such as was depicted in FIG. 14) and voltage measurements (using an analog digital converter (ADC)). Historically, most low-cost devices are designed for static loading, thus estimation has been an acceptable design choice.

Notably, static estimation techniques cannot be used under dynamic loading, since voltage is directly affected by the load (e.g., V=iR, i=C dv/dt, and/or any impedance.) A PWM driven NMOSFET results in highly variable voltage readings that present a challenge in estimating remaining battery capacity. As shown in FIG. 15, directly sampling the 50% duty cycle may capture an off-phase or the RC decay. Typically, measurements at ~50% duty cycle have the maximum amount of variation in the battery voltage; however, this may also vary based on current draw, sampling rate, etc. For example, large swings in current draw may cause erratic RC decay readings; similarly, irregular voltage sampling may coincidentally capture more off-phase measurements.

One scheme for dynamically estimating remaining battery capacity compares a "rolling window" of voltage measurements against characteristic discharge cycles for different duty cycles. The sampling rate of the battery measurement circuitry and the duty cycle are unlikely to exactly align. Different frequencies are orthogonal to one another within the frequency domain and will constructively and destructively interfere with one another according to a "beat frequency." However, time averaging the varying voltage can be used to filter out the non-DC (direct current) frequencies, leaving only a non-zero DC voltage. Even though the non-zero voltage is not a direct measurement of voltage, it may be used to characterize the voltage discharge curve for that combination of duty cycle and sample rate. While the foregoing technique uses a rolling window calculation, artisans of ordinary skill in the related arts will readily appreciate that a variety of other calculations may be substituted with equal success. Such other techniques may include time averaging, filtering, root-mean-square calculations, multiply-accumulate, and/or any other calculation that generates a characteristic non-zero value for a dynamic input.

More directly, battery voltage measurement data may be taken during a full discharge cycle at several different fixed PWM duty cycle values. Then, a "characteristic function" that describes the relationship between measured voltage and remaining battery capacity is determined based on one or more of: duty cycle, sample rate, battery chemistry, battery numerosity, battery configuration (parallel, series, etc.), or any other operational parameter. The characteristic functions can be stored within a device to enable subsequent determination of the specific battery capacity threshold based on the measured voltage.

In one embodiment, battery capacity estimation based on characteristic functions can be used within a holster or a flashlight. In such implementations, characteristic functions may be stored into the monitoring logic for battery capacity estimation. Specifically, the characteristic functions are measured and calculated for the exemplary lighting system 1300, at 100%, 75%, 50% and 25% duty cycles using a specified sample rate (e.g., ~40 Hz). The characteristic functions correspond to each of the different battery types used by the exemplary lighting system 1300—for example, each of the 3.7V lithium-ion batteries (rechargeable) or dry cell/single use batteries would have different characteristic functions. During operation, the monitoring logic may determine its battery configuration and collect time averaged battery voltage measurements. The monitoring logic may use the measured voltage to look-up the estimated remaining battery capacity based on the specific characteristic function for the duty cycle, sample rate, battery configuration, operational mode, and/or any other relevant parameter. The estimated remaining battery capacity may also be used to calculate a rate of change in the remaining battery capacity—this rate of change corresponds to the estimated current draw. The estimated remaining battery capacity and rate of change are collectively referred to throughout as the "usage estimates." The usage estimates can be provided to the user via user interface logic used to, e.g., indicate the remaining capacity and/or current draw on the indicator LEDs. In some variants, the monitoring logic may also inform the power management logic; for example, the remaining capacity and/or current draw may be used by the power management logic to select an appropriate power source.

In one specific variant, the time averaged battery voltage measurements are calculated over a rolling window of values (e.g., 4, 8, 16, 32-value average, etc.). Some battery chemistries exhibit misleading behavior based on load and/or environmental factors. For example, certain types of batteries may have a "false" recovery that results in a higher resting voltage; however, the voltage rapidly drops to a more representative voltage under load. In other cases, batteries may have a different characteristic voltage based on ambient temperature, humidity, atmospheric pressure, etc. In some variants, the device logic (hardware, firmware, or software) may use a "ratcheting" level that prevents misleading behavior of calculating remaining charge in the battery. In other words, the indicator LEDs cannot display a rise above a breached lower threshold until e.g., a battery has been changed/recharged or otherwise reset. For example, once the remaining capacity has fallen from 75% to 50%, the device logic will cap the subsequent readings to 50%. The device logic will only re-enable the 100% and 75% levels after a power cycle, batteries change (or charged), etc.

In some embodiments, the user interface logic provides a continuous read-out (to, e.g., the indicator LEDs). Other embodiments may allow the user to selectively check the battery usage estimates only "as-needed." For example, all LED rows may be only momentarily lit when the user presses the ON switch (e.g., power switch), or a user may be able to individually check the power for only one of the power sources (e.g., a small push button may allow a user to check the status of the battery, etc.). Still other implementations may allow display status briefly at the start of and/or periodically during, a specific operating mode.

More generally, the user interface logic of the PCB and indicator LEDs allows a user to determine the ongoing usage and remaining capacity for any one of the power sources. In some cases, the user may be alerted as to when to change batteries, switch power sources, and/or reduce usage. While the foregoing discussion is presented in the context of a specific arrangement and/or color code of LEDs, other arrangements/color codes, as well as other user interface schemes (e.g. audible and/or haptic) may be substituted with equal success (as discussed above with respect to indicator LEDs).

While the foregoing discussion is presented in the context of a specific arrangement and/or color code of LEDs, other arrangements/color codes may be substituted with equal success. Notably, any number of LEDs may be used to signify capacity according to any specific granularity. As one example, 10 LEDs may be used to provide 10% increments (a linear scale). In another example, 4 LEDs may be used to provide logarithmic scale increments (e.g., 10%, 25%, 50%, 100%). Different colors may also be used e.g., red, orange, yellow, green, blue, indigo, violet, etc. to represent different current draws. Still other variants may switch the representation e.g., the color may indicate the percentage left, the number of lit LEDs may represent the current draw.

While the foregoing is described in the context of an on-device visual display, other user interface schemes may be substituted with equal success. In some cases, the notifications may be audible and/or haptic. For example, beeps at different note pitches may be used to convey usage estimates. As but one such example, the number of beeps may indicate remaining capacity e.g., four beeps may indicate 100%, three beeps may indicate 75%, etc. The pitch of the beeps may indicate current draw e.g., 440 Hz ($A_4$ note) may indicate low/no draw, 523.25 Hz ($C_5$ note) may indicate moderate draw, etc. As another example, a "rumble box" may use similar numerosity/frequency schemes to convey information in a tactile modality. In yet other schemes, usage estimates may be wirelessly transmitted to a remote device (smart phone or laptop) that can remotely notify the user according to an application user interface. A wide variety of other user experience (UX) may be substituted with equal success.

11.2 Protection Circuitry

Dynamic loading may introduce undesirable harmonics in either the power sources themselves or the load they are connected to. As a related note, AC power from wall outlets may have residual harmonics and/or noise (which may even survive AC/DC conversion). Examples of undesirable effects that may be introduced by harmonics may include e.g., overshoot/undershoot, noise, interference, fluctuations, etc. In a separate but related tangent, directly coupling different power sources together (without additional power management logic) may create voltage mismatches that damage other circuitry or lead to cell premature failure, excessive discharge, overheating, leakage, and eventually rupture. In view of these issues, power conditioning circuitry may be used to protect the load subsystem 1302 and/or protection circuitry may be used to protect the power sources from one another.

Various embodiments of the present disclosure may incorporate power conditioning techniques to ensure that sourced power does not exceed acceptable tolerances, the rate of change does not exceed acceptable tolerances, and has (or does not have) certain frequency characteristics. As but one example, voltage and/or current regulation may ensure that overvoltage/undervoltage does not damage the load subsystem. Furthermore, additional resistance, capacitance, and/or inductance may be added to filter out problematic resonant frequencies. Non-linear components (such as Zener diodes, etc.) may also be used to ensure that excess power is diverted from sensitive circuits.

Certain harmonics may interfere with the normal operation of internal (or external) circuits. For example, duty cycle-based circuitry may introduce noise into the clocking signals of a nearby processor resulting in timing errors, etc. In some cases, certain frequencies are necessary for circuit operation. For example, some clock circuitry may use 60 Hz (from AC outlet power) to calculate timing; but synthesizing a 60 Hz power signal from battery-based power sources may not match the expected frequency content. Thus, frequency regulation may be used to stabilize frequencies, or synthesize additional frequencies.

More generally, artisans of ordinary skill in the related arts, given the contents of the present disclosure, will readily appreciate that any number of different power conditioning circuits may be used to clean and stabilize output power. Functionally, such conditioning circuits may e.g., regulate voltage, suppress transients, regulate frequencies, filter harmonics, filter noise, convert between voltage/current, etc.

11.3 Other Power Source Considerations

As a brief aside, alternating current (AC) and direct current (DC) are two fundamentally different ways of transmitting and using electrical energy. AC voltage periodically reverses direction. It continuously alternates between positive and negative cycles, creating a sinusoidal waveform. In contrast, DC voltage is unidirectional, meaning it flows in a constant direction from positive to negative terminals. AC is typically used for transmission and distribution because it can be easily transformed into different voltage levels using transformers. It is also used in most household and commercial electrical systems because it is easy to generate and distribute. Conversely, DC circuits are generally simpler; for example, a DC motor can vary speed and provides consistent torque (both of which are difficult to do with AC motors). DC circuits are commonly used in hand tools, electronic devices (like smartphones and laptops), automotive systems, and some specialized applications like solar photovoltaic systems.

In some embodiments, the exemplary lighting system 1300 may incorporate rectifiers, inverters, and/or transformers. A rectifier may be used to convert alternating current (AC) voltage into direct current (DC) voltage. It "rectifies" the AC waveform by allowing current to flow in only one direction. An inverter does the opposite of a rectifier; it "inverts" DC voltage into AC voltage. Inverters generate a sinusoidal or modified sine wave AC output. Transformers can be used to increase (step-up) or decrease (step-down) the voltage level of an AC voltage without changing its frequency.

Transformers have a variety of useful properties. First, transformers may be used to match the voltage of electrical equipment to the available supply voltage. For example, industrial equipment may require a specific voltage level that differs from the standard distribution voltage. Secondly, transformers may be used to match the impedance between two components of a circuit, optimizing power transfer. This is particularly important in audio systems and radio frequency applications. Thirdly, transformers can introduce a controlled phase shift between the input and output voltages. This property is used in various applications, including power factor correction and inductive coupling in electronic circuits.

Another consideration for power sources is recharging functionality. During charging operation, the power subsystem 1306 may recharge a battery (converting electrical energy to a chemical potential for storage). The charging process is typically a multi-stage process that e.g., delivers a constant current to the battery until the battery reaches a specified voltage level (a so-called "constant current" stage), deliver a constant voltage until the battery no longer consumes current (a so-called "constant voltage" stage), and maintains a low current to the battery to top-up from self-discharge (a so-called "trickle charge" stage). In some embodiments, the power subsystem 1306 can both provide power, while also concurrently charging. For example, a device that may operate from wall socket power while also using excess power to charge its batteries.

In some variants, the power subsystem 1306 may include a charging circuit that additionally monitors the charging source and destination to ensure that the charging process operates safely (overcharging can damage batteries and/or result in catastrophic failures). For example, charging circuitry may include circuitry to prevent over (and under)

charging of a battery. The circuitry may include a protection circuit module (PCM) configured to manage basic safety functions of the battery including over-voltage, under-voltage, and over-current. In some cases, the PCM additionally monitors battery temperature which can be used to infer aspects of battery operation (e.g., performance, charging state, etc.). In some additional examples, the charging circuitry includes a secondary safety circuit to protect the battery from charge in the event the primary safety circuit fails.

More generally, artisans of ordinary skill in the related arts will readily appreciate that integrating multiple power sources within a single system to service a variety of dynamic loads may require additional supporting circuitry to address these differences. For example, a system may have a transformer to step-down AC power, a rectifier to convert the reduced AC power into DC power, and a charging circuit that manages the battery charging process. As another such example, an inverter may be used to convert DC power to AC power for devices that are usually used with wall outlets.

12 Control and Data Subsystem

Within the context of the present disclosure, the control and data subsystem 1308 monitors the power subsystem 1306 and/or the load subsystem 1302 and adjusts power provisioning according to the dynamic loading activity of the load subsystem 1302. The following discussions provide several illustrative embodiments of control and data subsystem 1308, however, artisans of ordinary skill in the related arts given the contents of the present disclosure will readily appreciate that the virtually any control and data logic may be substituted with equal success.

In one exemplary embodiment, the control and data subsystem 1308 may include a processor and a non-transitory computer-readable medium that stores program instructions and/or data. During operation, the processor performs several actions according to a clock. These may be logically subdivided into a "pipeline" of processing stages. For example, one exemplary pipeline might include: an instruction fetch (IF), an instruction decode (ID), an operation execution (EX), a memory access (ME), and a write back (WB). During the instruction fetch stage, an instruction is fetched from the instruction memory based on a program counter. The fetched instruction is provided to the instruction decode stage, where a control unit determines the input and output data structures and the operations to be performed. These input and output data structures and operations are executed by an execution stage. For example, an instruction (LOAD R1, ADDR1) may instruct the execution stage to "load" a first register R1 of registers with the data stored at address ADDR1. In some cases, the result of the operation may be written to a data memory and/or written back to the registers or program counter.

Artisans of ordinary skill in the related arts will readily appreciate that the techniques described throughout are not limited to the basic processor architecture and that more complex processor architectures may be substituted with equal success. Most processor architectures implement e.g., different pipeline depths, parallel processing, more sophisticated execution logic, multi-cycle execution, and/or power management, etc.

As a practical matter, different processor architectures attempt to optimize their designs for their most likely usages. More specialized logic can often result in much higher performance (e.g., by avoiding unnecessary operations, memory accesses, and/or conditional branching). For example, a general-purpose CPU may be primarily used to control device operation and/or perform tasks of arbitrary complexity/best-effort. CPU operations may include, without limitation: best-effort operating system (OS) functionality (power management, UX), memory management, etc. Typically, such CPUs are selected to have relatively short pipelining, longer words (e.g., 32-bit, 64-bit, and/or superscalar words), and/or addressable space that can access both local cache memory and/or pages of system virtual memory. More directly, a CPU may often switch between tasks, and must account for branch disruption and/or arbitrary memory access.

As another example, a microcontroller may be suitable for embedded applications of known complexity. Microcontroller operations may include, without limitation: real-time operating system (OS) functionality, direct memory access (DMA) based hardware control, etc. Typically, microcontrollers are selected to have relatively short pipelining, short words (e.g., 8-bit, 16-bit, etc.), and/or fixed physical addressable space that may be shared with hardware peripherals. Typically, a microcontroller may be used with static/semi-static firmware that is application specific.

Application specific integrated circuits (ASICs) and field-programmable gate arrays (FPGAs) are other "dedicated logic" technologies that can provide suitable control and data processing. These technologies are based on register-transfer logic (RTL) rather than procedural steps. In other words, RTL describes combinatorial logic, sequential gates, and their interconnections (i.e., its structure) rather than instructions for execution. While dedicated logic can enable much higher performance for mature logic (e.g., 50×+ relative to software alternatives), the structure of dedicated logic cannot be altered at run-time and is considerably less flexible than software.

Application specific integrated circuits (ASICs) directly convert RTL descriptions to combinatorial logic and sequential gates. For example, a 2-input combinatorial logic gate (AND, OR, XOR, etc.) may be implemented by physically arranging 4 transistor logic gates, a flip-flop register may be implemented with 12 transistor logic gates. ASIC layouts are physically etched and doped into silicon substrate; once created, the ASIC functionality cannot be modified. Notably, ASIC designs can be incredibly power-efficient and achieve the highest levels of performance. Unfortunately, the manufacture of ASICs is expensive and cannot be modified after fabrication—as a result, ASIC devices are usually only used in very mature (commodity) designs that compete primarily on price rather than functionality.

FPGAs are designed to be programmed "in-the-field" after manufacturing. FPGAs contain an array of look-up-table (LUT) memories (often referred to as programmable logic blocks) that can be used to emulate a logical gate. As but one such example, a 2-input LUT takes two bits of input which address 4 possible memory locations. By storing "1" into the location of 0 #b'11 and setting all other locations to be "0" the 2-input LUT emulates an AND gate. Conversely, by storing "0" into the location of 0 #b'00 and setting all other locations to be "1" the 2-input LUT emulates an OR gate. In other words, FPGAs implement Boolean logic as memory-any arbitrary logic may be created by interconnecting LUTs (combinatorial logic) to one another along with registers, flip-flops, and/or dedicated memory blocks. LUTs take up substantially more die space than gate-level equivalents; additionally, FPGA-based designs are often only sparsely programmed since the interconnect fabric may limit "fanout." As a practical matter, an FPGA may offer lower performance than an ASIC (but still better than software equivalents) with substantially larger die size and power consumption. FPGA solutions are often used for limited-run, high performance applications that may evolve over time.

12.1 Power Source Selection and Monitoring Logic

Figure 16:
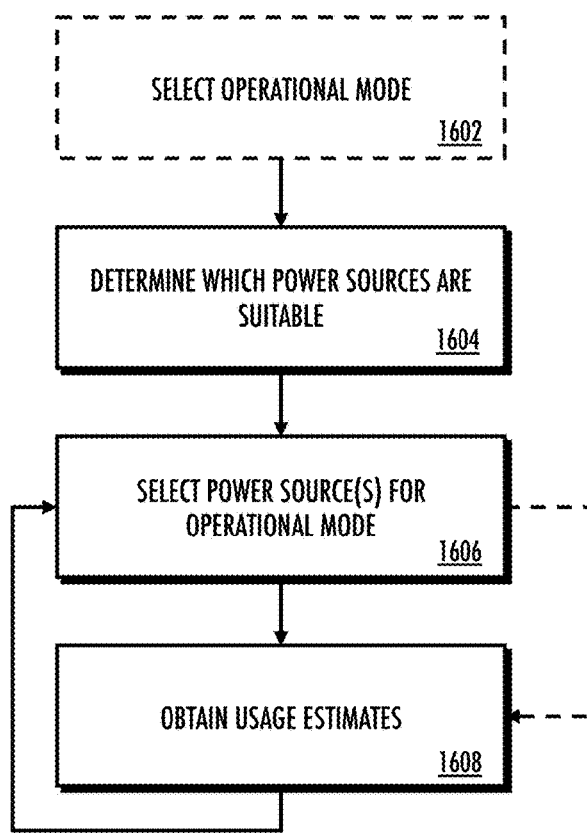
FIG. 16 illustrates logical flow diagrams of methods for power management and monitoring in accordance with the various techniques described herein.
Figure 16:
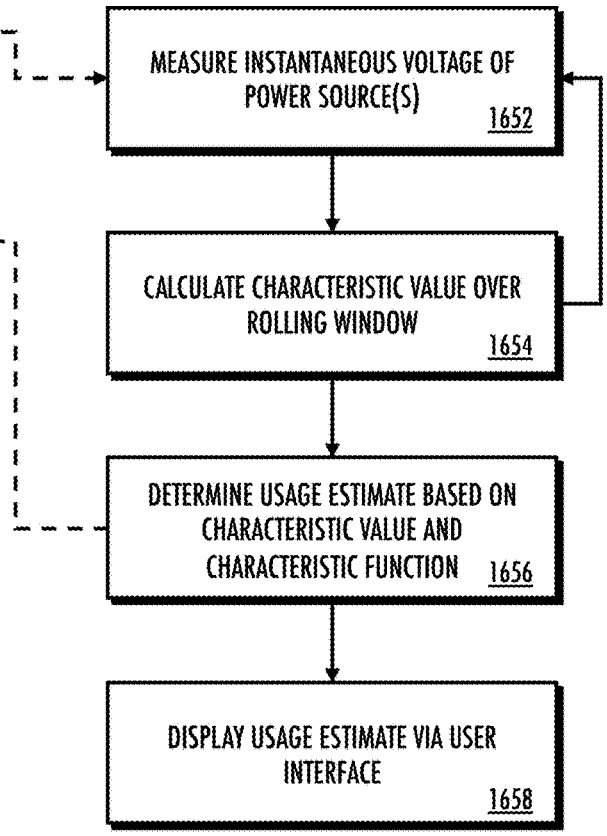

In one exemplary embodiment, data may be stored as non-transitory symbols (e.g., bits, bytes, words, and/or other data structures.) In one specific implementation, the memory subsystem is realized as one or more physical memory chips (e.g., NAND/NOR flash) that are logically separated into memory data structures. The memory subsystem may be bifurcated into program code (e.g., power management instructions 1600, and monitoring instructions 1650 of FIG. 16) and/or program data (not shown). In some variants, program code and/or program data may be further organized for dedicated and/or collaborative use. For example, a microcontroller and hardware driver may share a physical memory buffer to facilitate data transfer without memory indirection. In other examples, a microcontroller may have a dedicated memory buffer to avoid resource contention.

While the following discussion is presented in the context of two separate processes, the processes may be combined into a single process or further subdivided into three or more processes with equal success. Additionally, the following steps are discussed in the context of software instructions stored on memory and executed via a processor, however alternative implementations may use dedicated hardware (combinatorial and sequential logic) and/or firmware (software/hardware hybrids).

Referring now to the power management instructions 1600, a user selects one or more operational modes from a plurality of operational modes (step 1602). As previously noted, operational modes may include lighting modes, charging modes, data transfer/playback modes, and/or any other set of active functions. In some embodiments, the operational modes may be selected based on user selection. For example, a user may manually select between USB charging and/or lighting using switches, buttons, or other user interface components. In other embodiments, the operational modes may be selected based on the power management logic's internal heuristics and/or configuration.

For instance, the power management logic may automatically charge connected devices (e.g., the batteries, external devices), plugged devices (e.g., after USB enumeration procedures, etc.) and/or automatically enable/disable lighting based on motion activation, ambient light detection, etc. Accordingly, power management logic may determine the loads needing power including internal loads (e.g., a lighting assembly, indicator LEDs, processing/charging circuitry) and external loads (e.g., external sensors, external devices to charge or power, etc.). In some cases, the power management logic may prevent certain operational modes—for example, high current drain lighting may disable external charging, or with low remaining battery charge reduce the brightness of or disable certain types of lighting and/or vice versa.

Power management logic may include detecting and/or monitoring connected (or disconnected) loads. For example, an external device or sensor may be connected to the lighting system. A physical connection may be detected by various means. For example, the power management logic may detect electrical resistance on pins may be measured using a pull-down/pull-up resistor circuit. In a pull-down resistor circuit, a resistor is connected between an input pin (e.g., a charging contact) and the ground (GND) of a microcontroller of the power management logic. When a device is not connected, the resistor pulls the input pin to a logic low level (e.g., 0V or ground). This indicates the absence of a connection. When a device is connected, an external signal source (e.g., the connected device or a switch) overrides the pull-down resistor's effect, and the voltage at the input pin rises to a logic high level (in some examples, close to the supply voltage, e.g., 3.3V or 5V). In a pull-up resistor circuit, a resistor connects the input pin to the positive voltage. When no device is present, the pull-up resistor pulls the input pin to a logic high level (in some examples, close to the supply voltage, e.g., 3.3V or 5V). This indicates the absence of a connected device. When a device is connected, the external signal source (e.g., the connected device or a switch) overrides the pull-up resistor's effect, and the voltage at the input pin drops to a logic low level (e.g., close to ground).

Additional exemplary implementations may use one or more of the following mechanisms: a physical switch that is flipped when a device is connected, optical sensors that get covered when a device is connected, weight or pressure sensors detect a difference, a change in magnetic fields detected, a hall effect sensor detecting the presence/absence of a magnetic field (due to, e.g., a magnet in the connected device), etc.

At step 1604, the power management logic determines a set of power sources that are suitable for the selected operational mode(s). Determining suitable power sources may include determining the kind, type, and/or charging status of available connected power sources. Power sources may include internal power sources (e.g., internal batteries, solar panels, etc.) or external power sources (e.g., connected devices like a power bank, etc.). Power sources may include, without limitation, dry cell batteries, rechargeable batteries, solar panels, hand-crank generator, fuel-based generators, fuel cells, piezo-electric cells, "mains" or "wall" power, and/or external power interfaces (e.g., USB, PoE), and/or any other source of electrical power.

In one embodiment, power management logic may be select between single-source or multiple source power supplies. As used herein, the term "single source" refers to a power supply that can select one power source from multiple power sources. For example, so-called "dual power" devices are devices that are designed to accept either single-use or rechargeable cells, but not at the same time. A dual power device may accept one battery cartridge for single-use batteries and another for rechargeable batteries. In another example, a single battery cartridge type can accept either single-use or rechargeable batteries (but not a mix of types). Dual power devices lack the onboard intelligence to manage different cell chemistries; thus, mixing cell types can result in the problems described above (reduced power, damage, and/or rupture). In some situations, dual power devices can also be inconvenient because the consumer may need to carry both options with them and to know in advance what their power needs will be.

As used herein, the term "multiple source" refers to a power supply that can combine power outputs from multiple power sources. For example, "hybrid power devices" may include circuitry that monitors power conditions of the different power sources and may make intelligent power management decisions on how to budget available power for a user of the device. Ideally, hybrid power devices can accommodate different power supplies, flexibly address different usages, and improve the convenience of use. For example, the exemplary lighting system 1300 may combine output from multiple power sources (e.g., a solar panel and an internal rechargeable battery).

Various embodiments of the present disclosure may limit operational modes to certain suitable power sources. For example, suitable power draw may not be available from an on-device solar panel to power the needed lighting; supplemental current may be drawn from the rechargeable battery or the solar panel may be disabled. In another example, 3 AA or 3 D batteries can both generate up to 4.5V but at different current draws; thus, either power supply may be suitable for certain lighting modes. Similarly, external charging may preferentially use the 3.7V lithium-ion, with a fallback to 3 AA batteries. In some cases, suitability preferences may be used to prioritize/de-prioritize operational modes; for example, the exemplary lighting system 1300 may preserve its internal battery when there is sufficient current available from the solar panel or when coupled to an external source of power via a USB-charging port. In some examples, the exemplary lighting system 1300 may use certain power sources (e.g., the rechargeable battery) for high-intensity loads (e.g., certain lighting applications), devices (e.g., a device connected for charging) or interfaces (e.g., charging contacts), but not others. For example, charging a connected device via a USB interface. In other cases, suitability preferences may enable hybrid operation e.g., 4.5V can be concurrently sourced from AA and D cells without damage—but would result in harmful back current for the 3.7V lithium-ion. In some examples, a 4.5V load can be concurrently sourced from the internal battery and via a (power-in) USB interface. Some implementations may implement usage restrictions as static logic, other implementations may dynamically evaluate suitability based on a variety of factors. Examples of such factors may include e.g., minimum or maximum voltage/current/power requirements, user preferences, history of usage, battery condition, battery hysteresis (memory effects), availability of alternative power supplies, and/or any other operational consideration.

At step 1606, the power management logic selects one or more power sources from the set of power sources for the operational mode. In one exemplary embodiment, the power management logic may select from multiple types of batteries and allow the batteries to be used separately, or concurrently. In another exemplary embodiment, the power management logic may select from powering device operations from connected power sources (e.g., via a USB power-in interface, a connected charging device, solar panels, etc.) and an internal battery and allow the various power sources to be used separately, or concurrently. The power management logic may intelligently monitor the availability of the power sources and the power remaining in all power sources; this information may be used to switch between the power sources. Ideally, the power management logic maximizes the power available for the lowest lifetime cost, while also offering the highest flexibility in power options.

For example, power management logic in the exemplary lighting system 1300 may monitor available the available charge/battery life in the internal battery or an external battery pack to determine whether to continue to charge the internal battery (or, e.g., leave remaining power in the external battery to power/charge other, perhaps emergency, components like a cellular phone or headlamp). Determinations of the remaining charge may be provided via a data connection between devices or determined via the requested load.

At step 1608, the power management logic obtains usage estimates from monitoring logic and may select (or re-select) another power source from the set of power sources for the selected operational mode. In some examples, usage estimates may be received from monitoring logic on a connected device.

Referring now to the monitoring instructions 1650, the instantaneous voltage of a power source is measured at step 1652. In one exemplary embodiment, voltage may be measured across a known impedance using an analog-digital conversion (ADC). Impedance based measurements may consider both resistance (frequency independent) and/or reactance (frequency dependent). For example, certain duty cycles and/or sampling frequencies may use frequency-dependent resonance/interference to amplify and/or attenuate measurements. Then, the monitoring logic calculates a characteristic voltage for a rolling window at step 1654.

As used herein, "instantaneous" refers to a specific measurement of a time-varying quantity at a specific time (an instance). "Characteristic" refers to a representative measurement for a time-varying quantity over a window of time. As previously noted, characteristic measurements may include averaging (mean, median, range), filtering, root-mean-square calculations, multiply-accumulate, and/or any other calculation that generates a characteristic non-zero value for a dynamic input.

In some embodiments, the granularity of the instantaneous measurements, the sample rate, and/or the size of the rolling window may be selected to provide a specific granularity. For example, a 4-bit ADC can generate up to 16 different values, an 8-bit ADC can generate up to 256 values. The sampling rate (e.g., 1 Hz (1/sec), 2 Hz (2/sec), ... 40 Hz (40/sec), etc. affects the relative responsiveness of measurements. Accumulating these values over the rolling window could provide a substantial range of readings (e.g., accumulating 16 measurements could span 256-4096 different possible values over a duration between 200 ms-16 s). In some cases, the granularity may be specific to the operational mode. For example, a high-draw operational mode (e.g., 100% duty cycle light) will use battery power very quickly and may only need gross measurements at a relatively fast sample rate to detect the drop and/or rate of drop. In contrast, a low-draw operational mode (e.g., trickle charging) may need much finer granularity and/or a much slower sample rate to provide meaningful data. In other words, the monitoring logic may adjust its measurement accuracy/precision to suit the power consumption characteristics of the different operational modes.

At step 1656, the monitoring logic determines usage estimates based on the characteristic value and a characteristic function. In one exemplary embodiment, the characteristic function may be a look-up table that provides a correspondence between a characteristic value (e.g., a time averaged voltage measurement taken at a specific duty cycle and sample rate) to an estimated battery life based on the experimentally determined battery chemistry/characteristics. More generally, however, any suitable function may be substituted with equal success. Characteristic functions may be based on piecewise, point-wise, linear approximation, polynomial interpolation, etc.

In some examples, usage estimates (and/or voltage/characteristic values) may be provided to a connected device. For example, the exemplary lighting system 1300 may provide usage estimates of an internal battery to a connected battery pack when charging. The exemplary lighting system 1300 may receive the characteristic value and/or receive the voltage/characteristic values and calculate the characteristic value over a rolling window for power management, monitoring, and/or display.

At step 1658, the usage estimates are displayed via a user interface. Notably, indicator LEDs can represent different usage estimates based on the number lit and color. For example, the exemplary lighting system 1300 may have four indicator LEDs to indicate the draw (or charging) of the state of the internal battery of the device. In another example, the exemplary lighting system 1300 may have indicator LEDs to indicate the usage/remaining charge of each connected battery separately and/or connected external batteries based on receiving usage estimates from the external batteries. Other implementations may use any number of LEDs/colors to represent any number of different power information. More broadly, any scheme for representing usage may be substituted with equal success. For example, a sufficiently capable UI may provide usage estimates in more verbose or granular form e.g., a smart phone interface could provide a text readout with an estimated current draw (in amps/milliamps, etc.) and/or remaining capacity (amp hours, milliamp hours, etc.), or illustrate usage/capacity over time.

12.2 Operational Mode Selection

Figure 17:
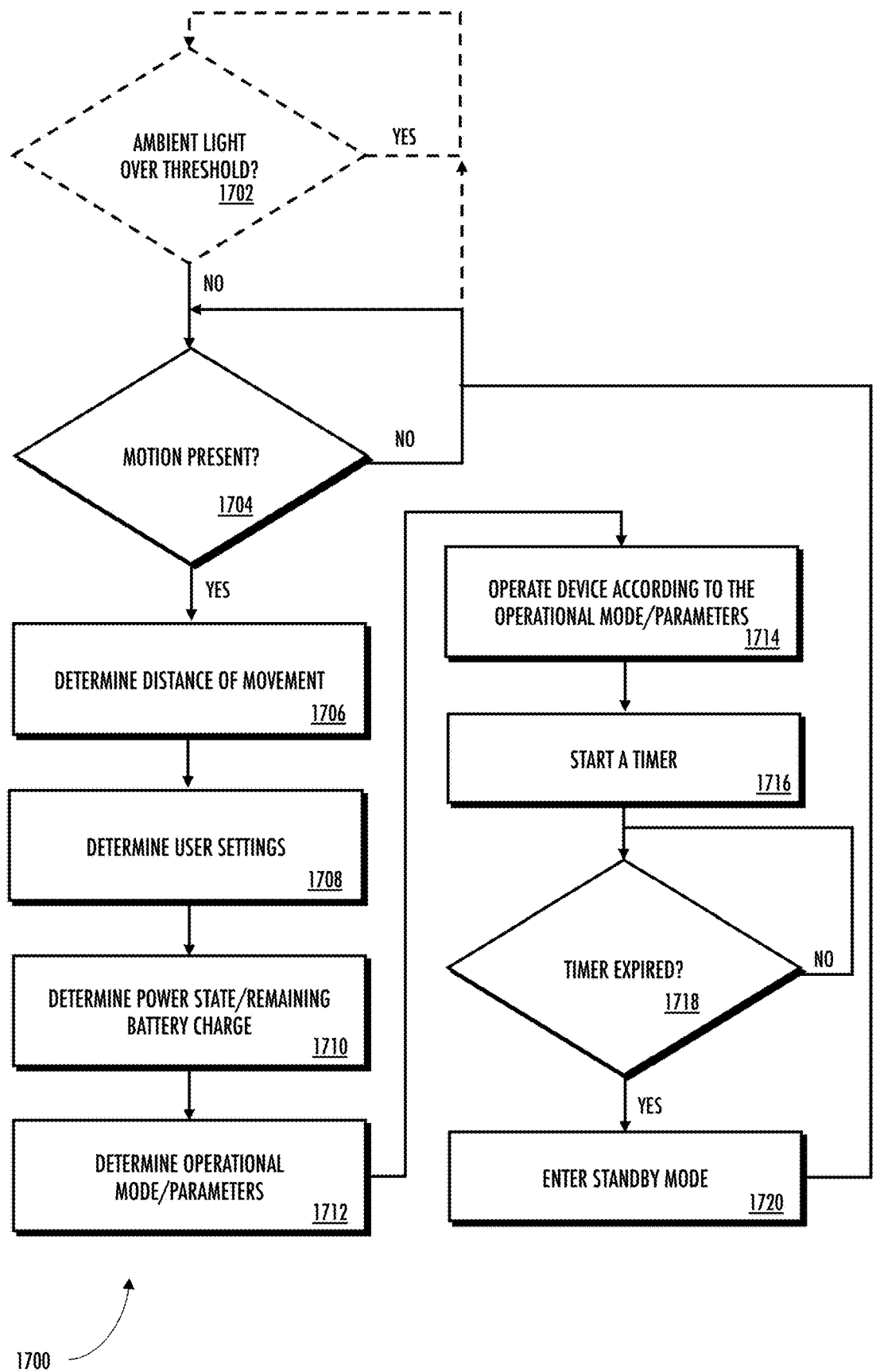
FIG. 17 is a logical flow diagram of a method for operational mode selection in accordance with the various techniques described herein.

In one exemplary embodiment, data may be stored as non-transitory symbols (e.g., bits, bytes, words, and/or other data structures.) In one specific implementation, the memory subsystem is realized as one or more physical memory chips (e.g., NAND/NOR flash) that are logically separated into memory data structures. The memory subsystem may be bifurcated into program code (e.g., operational mode selection instructions 1700 of FIG. 17) and/or program data (not shown). In some variants, program code and/or program data may be further organized for dedicated and/or collaborative use. For example, a microcontroller and hardware driver may share a physical memory buffer to facilitate data transfer without memory indirection. In other examples, a microcontroller may have a dedicated memory buffer to avoid resource contention.

While the following discussion is presented in the context of a single process, the process may be separated into multiple processes (and performed by e.g., different subsystems of the exemplary lighting system 1300) may be combined with other processes or further subdivided into two or more processes with equal success. Additionally, the following steps are discussed in the context of software instructions stored on memory and executed via a processor, however alternative implementations may use dedicated hardware (combinatorial and sequential logic) and/or firmware (software/hardware hybrids).

Referring now to the operational mode selection instructions 1700, when the exemplary lighting system 1300 is set to an automatic mode, the exemplary lighting system 1300 must determine which lights to power, how much power and other usage settings, and for how long. The exemplary lighting system 1300 may only operate in automatic mode from dusk to dawn (or in a dark setting). The exemplary lighting system 1300 may determine whether it is the correct time for operation when an ambient light sensor indicates the sensor/the exemplary lighting system 1300 is in a dark setting or when there is less than a threshold amount of light (at step 1702). If there is light over the threshold ("yes" branch), the device may continuously monitor the ambient lighting until the exemplary lighting system 1300 determines there is sufficient darkness/ambient light is below a threshold value to operate in the automatic mode (at step 1702).

If there is low ambient light (step 1702, "no" branch), the exemplary lighting system 1300 may determine whether motion is present in the area around the exemplary lighting system 1300 (at step 1704). The exemplary lighting system 1300 may use a motion sensor (e.g., PIR sensor, microwave sensor, etc.) to detect motion. If motion is not detected ("no" branch), the device may continuously monitor for motion (at step 1704) or return to determine whether there is low ambient light (at step 1702). In some examples, after there is sufficient time without motion detected (step 1704), the motion sensor will idle or be powered down while a determination is made as to whether there is low ambient light (at step 1702) before returning to determine whether there is motion detected (at step 1704).

If motion is detected ("yes" branch), the exemplary lighting system 1300 may determine the location of the movement or the distance of the movement relative to the exemplary lighting system 1300 (at step 1706). The exemplary lighting system 1300 may use a motion detection sensor (e.g., a microwave motion detection sensor) or other sensor (e.g., LIDAR, etc.) to determine distance or location of the movement. The area surrounding the exemplary lighting system 1300 may be designated into different zones and the distance of movement may determine which zone the movement is in. Similarly, where a location of the movement is determined, a sector (or angular slice) of a zone may be determined. Device operation may vary based on the zone and/or sector.

For example, the exemplary lighting system 1300 based on the location of the movement, the system may ignore the motion (and, e.g., idle). This may occur where the location or direction of motion is above the ceiling, below a floor, or behind a wall or other obstruction. Otherwise, different lighting or lighting settings may be employed (e.g., lighting in the direction of the motion).

An alert that motion was detected by the exemplary lighting system 1300 may be provided to other devices. The alert may be based on the detected distance/direction of motion. For example, motion detected crossing within a threshold distance of the exemplary lighting system 1300 may turn on path lighting leading up to a home or a (smart) lamp connected to a smart plug within the home. The alert may be sent via a wired or wireless interface (Bluetooth, WiFi, etc.). For example, the exemplary lighting system 1300 may send an alert to a device of the user (e.g., a phone, computer) via text/SMS message, push notification, etc. indicating motion was detected.

User settings/user preferences may be determined by the exemplary lighting system 1300 (at step 1708). These settings may vary based on direction/location. These settings/preferences may be global or may vary based on the distance/zone/sector of motion. These settings/preferences may include desired lights to activate, the brightness/intensity of the lights, the color or color temperature of the lights, duration the lights should remain on following the detection of motion. Other preferences may include whether audio should be played (via an onboard or external speaker) and at what volume. Whether audio/video should be recorded (via a microphone/camera) and sent to another device or stored in memory on the exemplary lighting system 1300. Other user settings may include power preferences (what to do when the charge of the internal battery is low or below a threshold amount)—including ignoring the state of the battery, reducing the number/brightness/or duration of lights, etc. Power preferences may also vary based on the distance/zone/sector of motion.

The exemplary lighting system 1300 may determine the power state of the device (at step 1710). The power state may include the remaining charge of the batteries or other power sources (as discussed above with respect to FIG. 16). Power metrics may also include the charging status of a connected solar panel (whether and how much power is being received), whether the exemplary lighting system 1300 is electrically coupled to an external/mains power, etc.

The exemplary lighting system 1300 may determine the operational mode/parameters for the device (at step 1712). This may be based on the determined distance/location/ zone/sector of motion, user settings/preferences, and the determined power state. Additional information may be used by the exemplary lighting system 1300 to determine device operation including other sensor data (e.g., precipitation sensors, GPS, accelerometer/gyroscope), data retrieved from other devices or via a network (e.g., time, weather information).

The exemplary lighting system 1300 may operate according to the determined operational mode/parameters (at step 1714). The exemplary lighting system 1300 may start a timer (at step 1716) based on the operational mode/parameters. The exemplary lighting system 1300 may determine whether the timer has expired (at step 1718). If the timer has not expired the device may continue in the operational mode (at step 1718, "no" branch).

If the timer has expired (at step 1718, "yes" branch), the device may enter a standby operational mode or otherwise idle (at step 1720). Idling may include entering a low power or standby state. For example, the lights and other loads may be powered off (or reduced in strength). Certain active sensors (e.g., microwave motion sensor, microphones/cameras, etc.) may be powered off. Other loads may remain active (ambient light sensor, microwave motion sensor, indicator lights, etc.) to keep the exemplary lighting system 1300 so the device may determine whether to "wake up" from the standby operational mode to a different/active operational mode (at steps 1702 or 1704).

13 Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant or implementation. The appearances of such phrases in various places in the specification are not necessarily all referring to the same embodiment, variant or implementation.

As used herein, the term "computer program" or "software" is meant to include any sequence of human or machine cognizable steps which perform a function. Such program may be rendered in virtually any programming language or environment including, for example, Python, JavaScript, Java, C#/C++, C, Go/Golang, R, Swift, PHP, Dart, Kotlin, MATLAB, Perl, Ruby, Rust, Scala, and the like.

As used herein, the term "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processor" or "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A lighting apparatus, comprising:
   one or more lighting devices;
   a microwave motion detection sensor comprising:
   pulse width modulation (PWM) circuitry configured to prepare a PWM microwave signal; and
   an antenna configured to transmit the PWM microwave signal;
   a controller; and
   a non-transitory computer-readable medium comprising instructions that when executed by the controller cause the lighting apparatus to:
   determine motion based on the microwave motion detection sensor;
   determine a distance of the motion from the lighting apparatus; and
   operate the one or more lighting devices based on the motion.

2. The lighting apparatus of claim 1, where the microwave motion detection sensor further comprises:
   a receive antenna configured to receive a reflected signal based on the PWM microwave signal; and
   a mixer configured to output a difference signal based on a difference between the PWM microwave signal and the reflected signal.

3. The lighting apparatus of claim 1, where the non-transitory computer-readable medium further comprising further instructions that when executed by the controller cause the lighting apparatus to:

operate the one or more lighting devices based on the distance of the motion.

4. The lighting apparatus of claim 1, where the non-transitory computer-readable medium further comprising further instructions that when executed by the controller cause the lighting apparatus to:
determine a brightness of the one or more lighting devices based on the distance of the motion.

5. The lighting apparatus of claim 1, where the non-transitory computer-readable medium further comprising further instructions that when executed by the controller cause the lighting apparatus to:
determine a lighting duration of the one or more lighting devices based on the distance of the motion; and
power down the one or more lighting devices after a completion of the lighting duration.

6. The lighting apparatus of claim 1, further comprising shielding configured to block the PWM microwave signal.

7. The lighting apparatus of claim 1, further comprising:
an ambient light sensor, where the non-transitory computer-readable medium further comprising further instructions that when executed by the controller cause the lighting apparatus to:
determine a low ambient light based on an output of the ambient light sensor, and
operate the one or more lighting devices based on the low ambient light.

8. The lighting apparatus of claim 1, further comprising:
a battery, where the non-transitory computer-readable medium further comprising instructions that when executed by the controller cause the lighting apparatus to:
determine a remaining charge of the battery, and
operate the one or more lighting devices based on the remaining charge of the battery.

9. The lighting apparatus of claim 1, further comprising:
a rechargeable battery;
a removable solar panel; and
charging circuitry electrically coupling the rechargeable battery and the removable solar panel.

10. A lighting apparatus, comprising:
one or more lighting devices;
a microwave motion detection sensor;
a controller; and
a non-transitory computer-readable medium comprising instructions that when executed by the controller cause the lighting apparatus to:
determine a motion based on the microwave motion detection sensor;
determine a distance of the motion based on the microwave motion detection sensor; and
operate the one or more lighting devices based on the distance of the motion.

11. The lighting apparatus of claim 10, where the microwave motion detection sensor is configured to intermittently transmit microwaves via a time slicing scheme.

12. The lighting apparatus of claim 10, where the microwave motion detection sensor is configured to:
transmit a microwave signal; and
receive a reflected signal based on the microwave signal.

13. The lighting apparatus of claim 12, where the distance of the motion is determined based on an amplitude of the reflected signal.

14. The lighting apparatus of claim 10, where the non-transitory computer-readable medium further comprising instructions that when executed by the controller cause the lighting apparatus to determine a zone of motion based on a distance range the distance of the motion is within.

15. The lighting apparatus of claim 14, where operating of the one or more lighting devices based on the distance of the motion comprises operating the one or more lighting devices based on the zone of motion.

16. A method of operating a lighting device, comprising:
determining a motion via a motion detection sensor;
determining a distance to the motion;
determining a lighting mode based on the distance; and
operating one or more lights of the lighting device according to the lighting mode.

17. The method of claim 16, further comprising:
determining an ambient light is below a threshold; and
operating the motion detection sensor based on the ambient light is below the threshold.

18. The method of claim 16, further comprising:
determining an operating duration based on the distance;
determining the operating duration completed; and
powering off the one or more lights of the lighting device based on the operating duration completed.

19. The method of claim 16, where determining the lighting mode comprises determining a lumen output of each of the one or more lights of the lighting device.

20. The method of claim 16, where determining the lighting mode is further based on a remaining charge of a battery.

* * * * *